(12) United States Patent
Witte et al.

(10) Patent No.: US 10,118,321 B2
(45) Date of Patent: Nov. 6, 2018

(54) TOOLING APPARATUS AND METHOD FOR DOUBLE-VACUUM-BAG DEGASSING OF A COMPOSITE LAYUP

(71) Applicant: The Boeing Company, Chicago, IL (US)

(72) Inventors: Philipp Witte, Everett, WA (US); Stanley W. Stawski, Camano Island, WA (US); Fedor A. Kleshchev, Renton, WA (US); Joshua Zarfos, Mill Creek, WA (US); Parth Naidu, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 339 days.

(21) Appl. No.: 14/988,528

(22) Filed: Jan. 5, 2016

(65) Prior Publication Data

US 2017/0190078 A1    Jul. 6, 2017

(51) Int. Cl.
| | |
|---|---|
| *B29C 43/12* | (2006.01) |
| *B64C 5/02* | (2006.01) |
| *B29C 70/44* | (2006.01) |
| *B29C 43/36* | (2006.01) |
| B29L 31/30 | (2006.01) |
| B64C 1/00 | (2006.01) |

(52) U.S. Cl.
CPC .......... *B29C 43/12* (2013.01); *B29C 43/3642* (2013.01); *B29C 70/44* (2013.01); *B64C 5/02* (2013.01); *B29C 2043/3644* (2013.01); *B29L 2031/3082* (2013.01); *B29L 2031/3097* (2013.01); *B64C 2001/0072* (2013.01)

(58) Field of Classification Search
None
See application file for complete search history.

(56) References Cited

U.S. PATENT DOCUMENTS

| | | |
|---|---|---|
| 2,838,435 A | 6/1958 | Hewett et al. |
| 4,165,358 A | 8/1979 | Johnson |
| 4,389,367 A | 6/1983 | Hudson |
| 4,693,678 A | 9/1987 | Von Volkli |
| 6,340,509 B1 | 1/2002 | Nelson et al. |
| 8,303,882 B2 | 11/2012 | Driver |
| 2002/0149134 A1 | 10/2002 | Hemphill et al. |

(Continued)

OTHER PUBLICATIONS

U.S. Appl. No. 14/876,715, filed Oct. 6, 2015 and entitled Method of Curing a Composite Article Using Differential Vacuum.

*Primary Examiner* — Monica Huson

(57) ABSTRACT

A tooling apparatus for manufacturing a composite structure may include a rigid outer tool for receiving a composite layup, a tubular inner vacuum bag in contact with the composite layup and defining an inner vacuum chamber, and an outer vacuum bag covering at least a portion of the rigid outer tool. The outer vacuum bag and the tubular inner vacuum bag may collectively define an outer vacuum chamber containing the composite layup. An outer bag vacuum source may be fluidly coupled to the outer vacuum bag for applying an outer bag vacuum pressure on the outer vacuum chamber. An inner bag vacuum source may be fluidly coupled to the tubular inner vacuum bag for applying an inner bag vacuum pressure on the inner vacuum chamber during application of the outer bag vacuum pressure on the outer vacuum chamber.

22 Claims, 24 Drawing Sheets

(56) References Cited

U.S. PATENT DOCUMENTS

| | | |
|---|---|---|
| 2010/0000667 A1 | 1/2010 | Funnell |
| 2011/0259508 A1* | 10/2011 | Inserra Imparato .. B29C 33/505 156/182 |
| 2014/0117593 A1 | 5/2014 | Lyons et al. |
| 2015/0137424 A1 | 5/2015 | Lyons et al. |

* cited by examiner

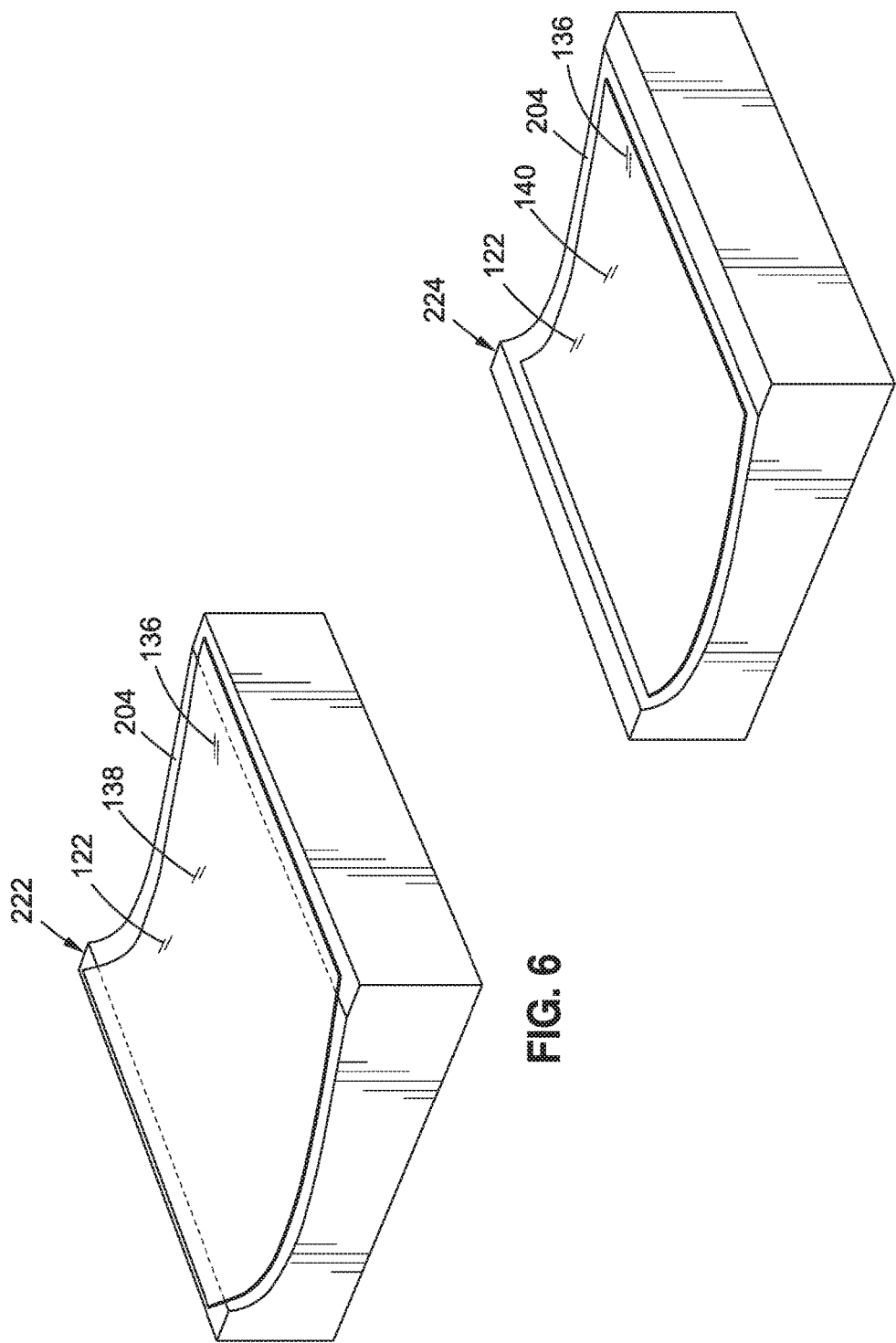

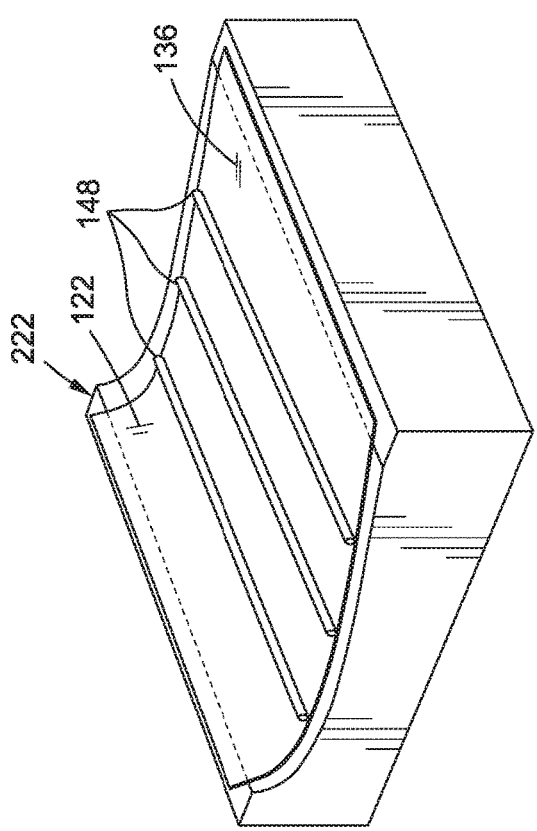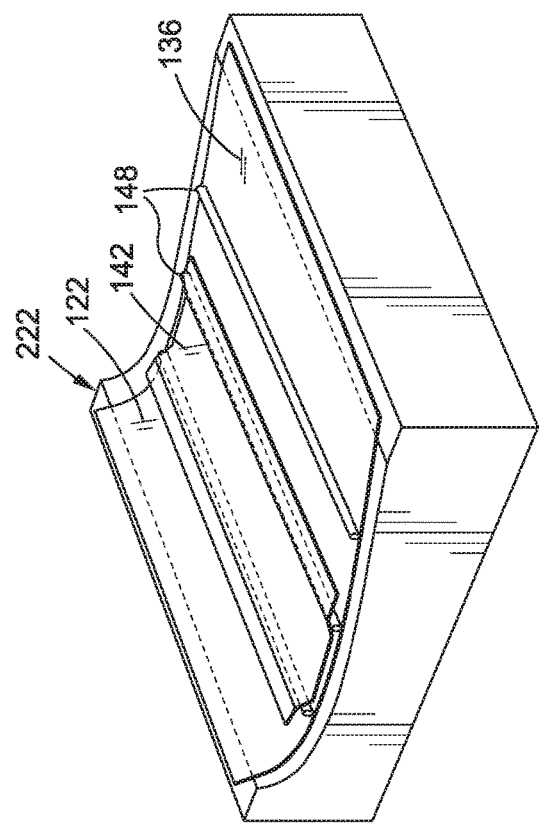

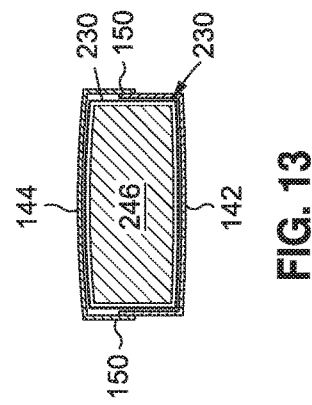
FIG. 11
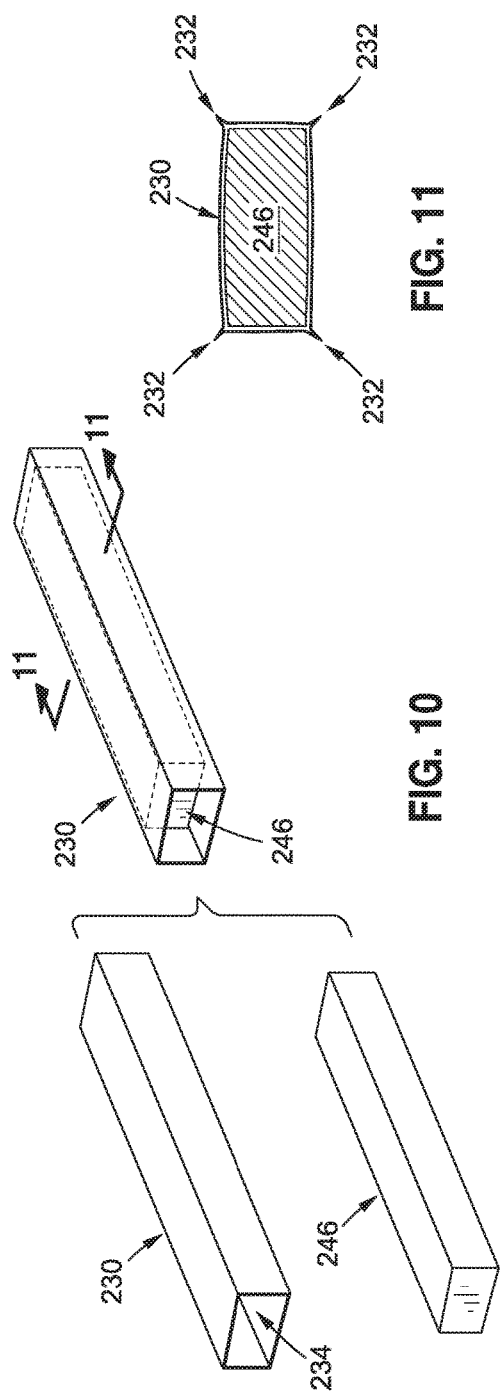
FIG. 10
FIG. 13
FIG. 12

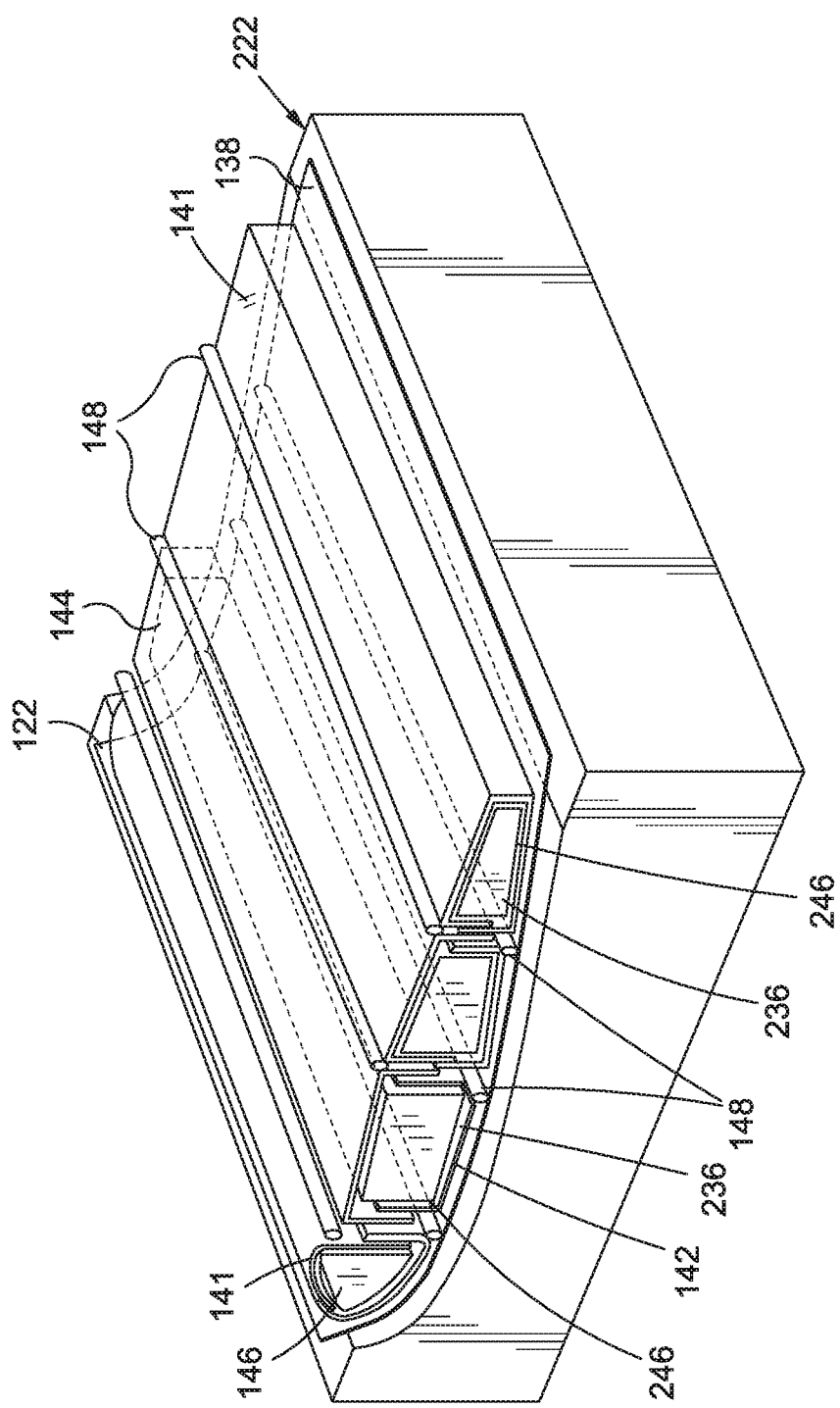

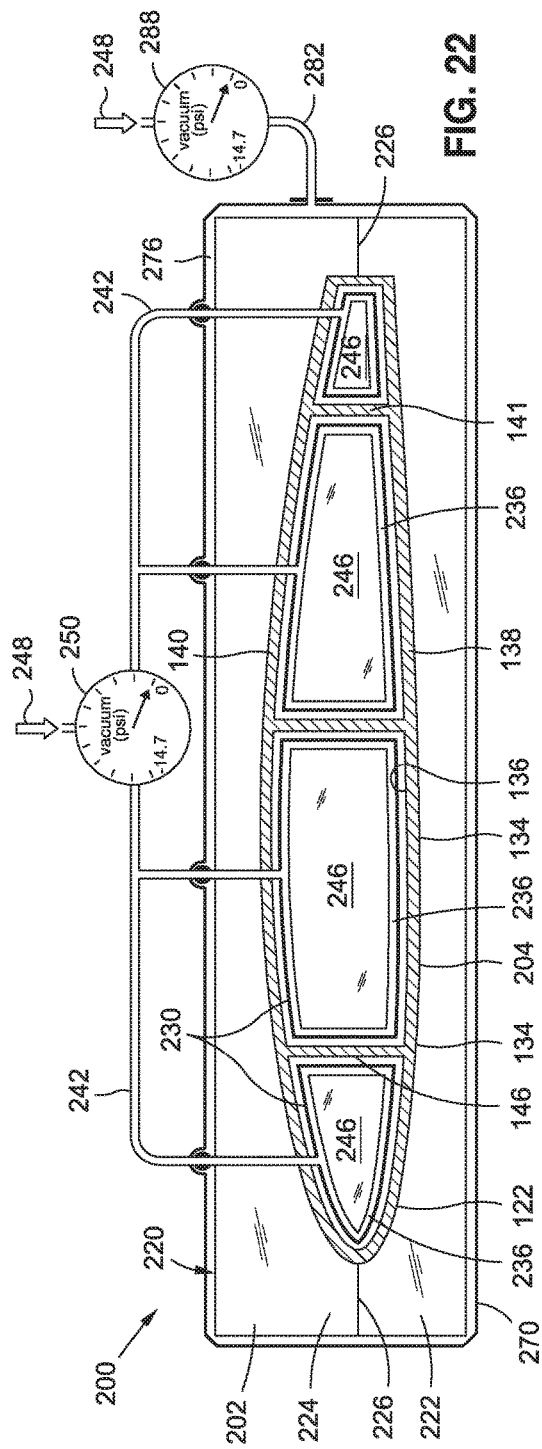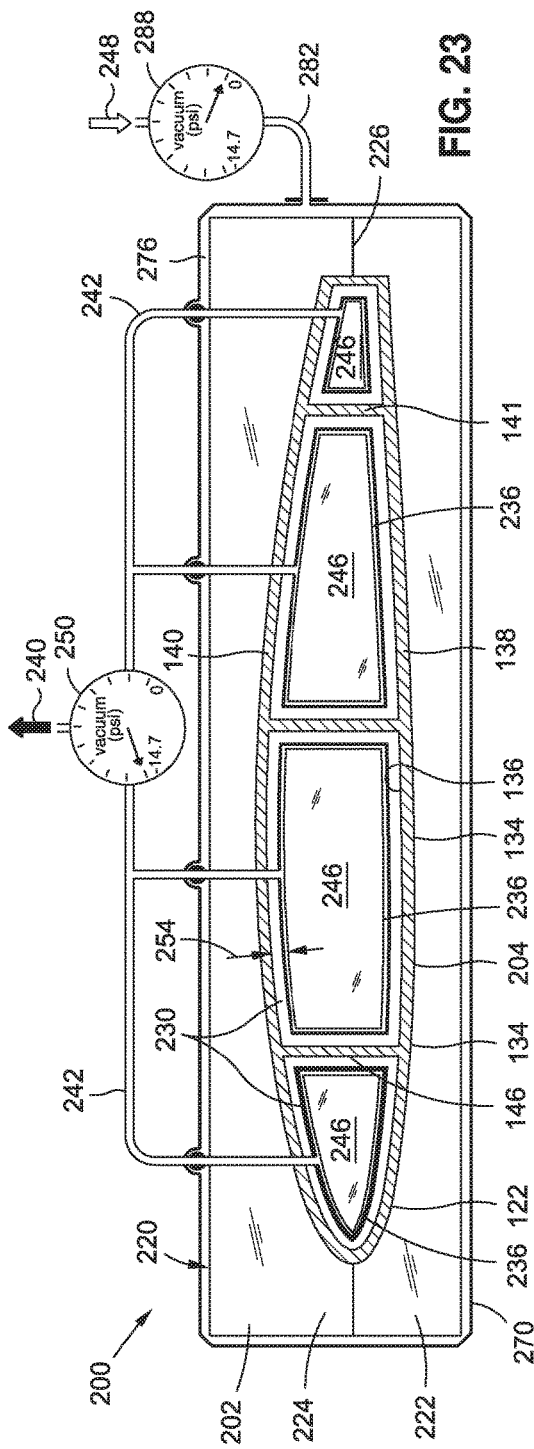

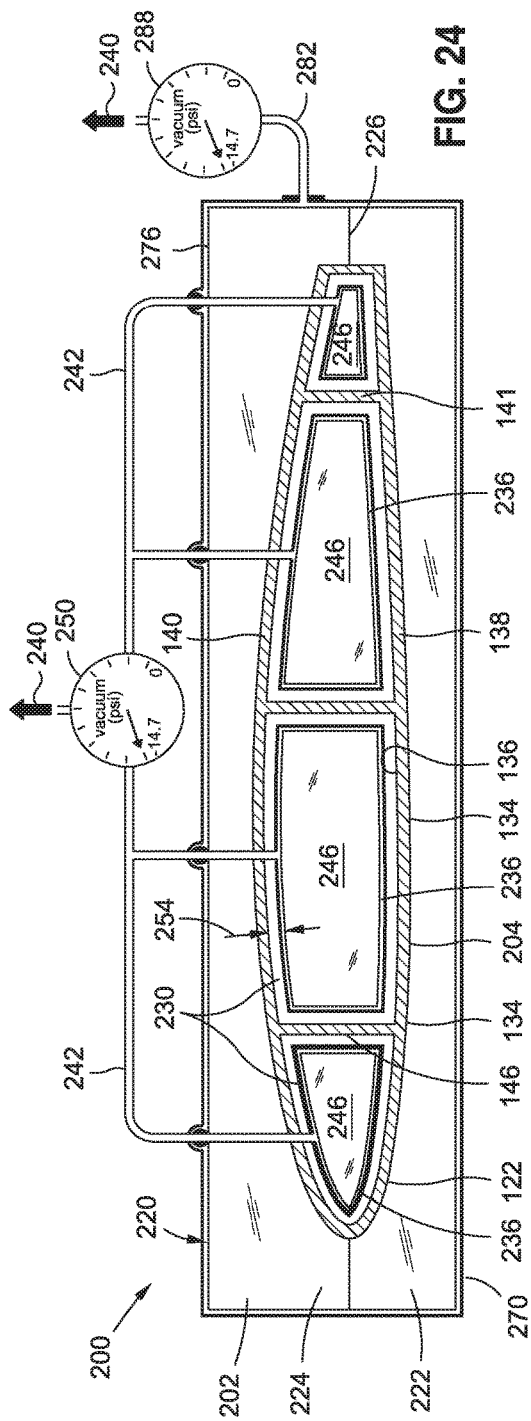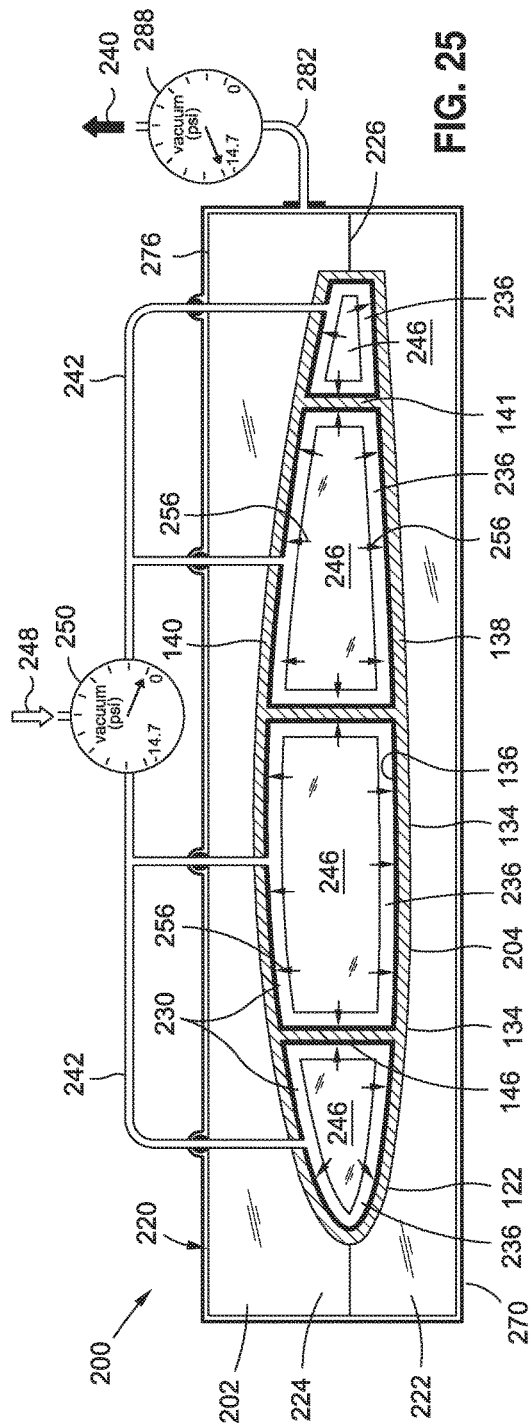

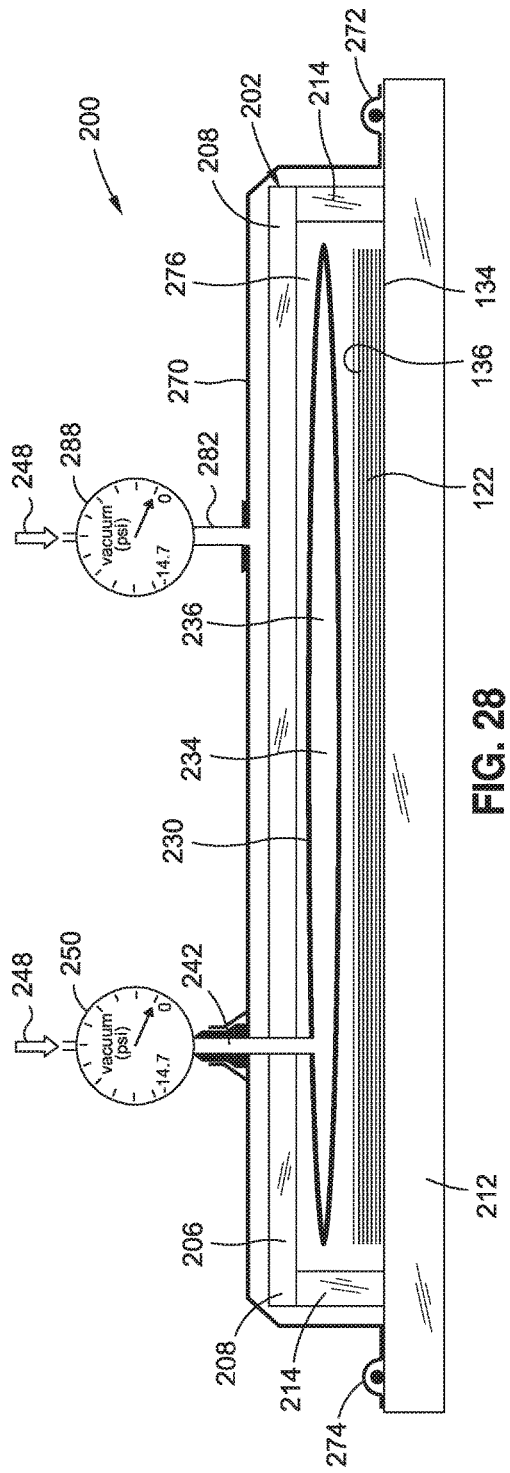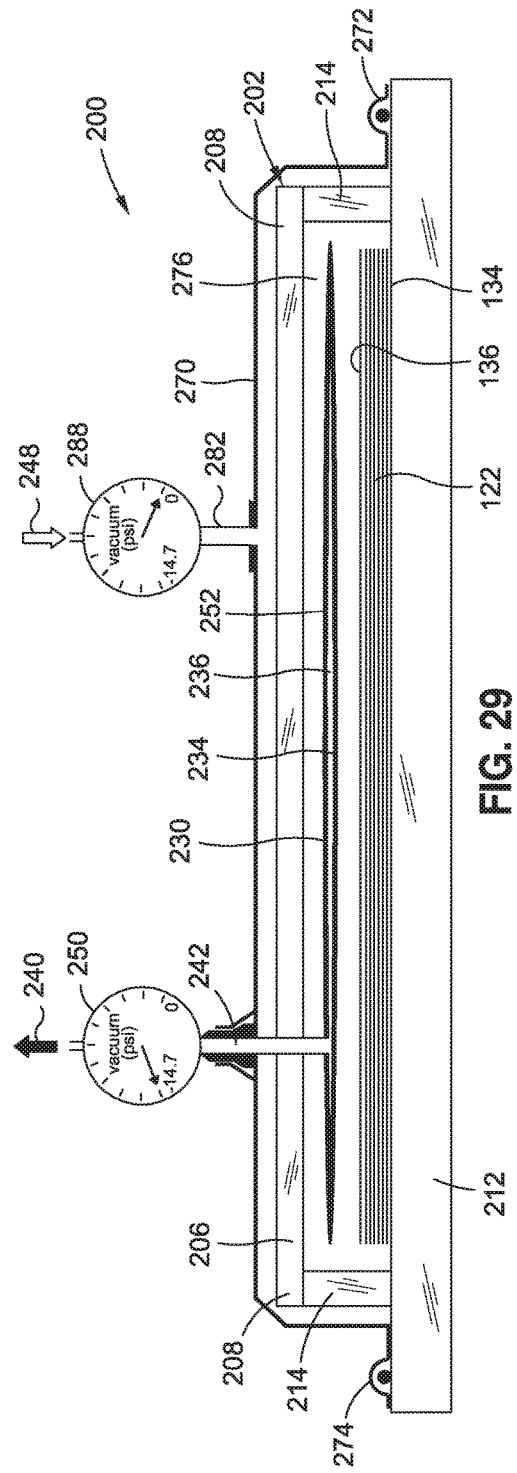

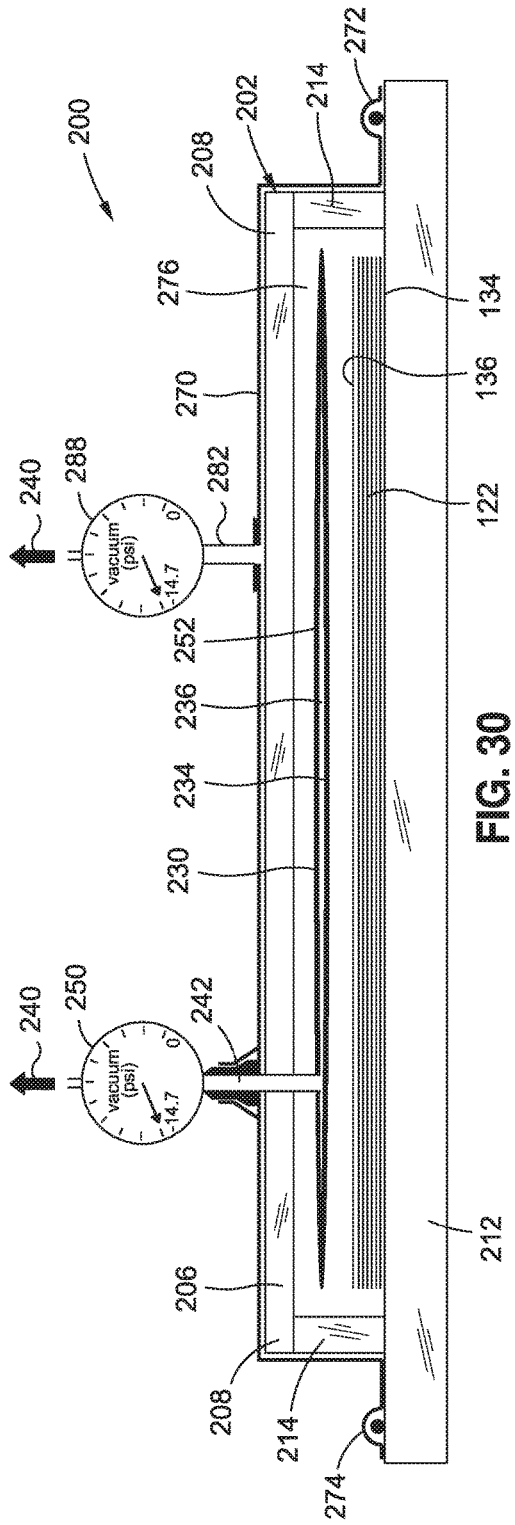
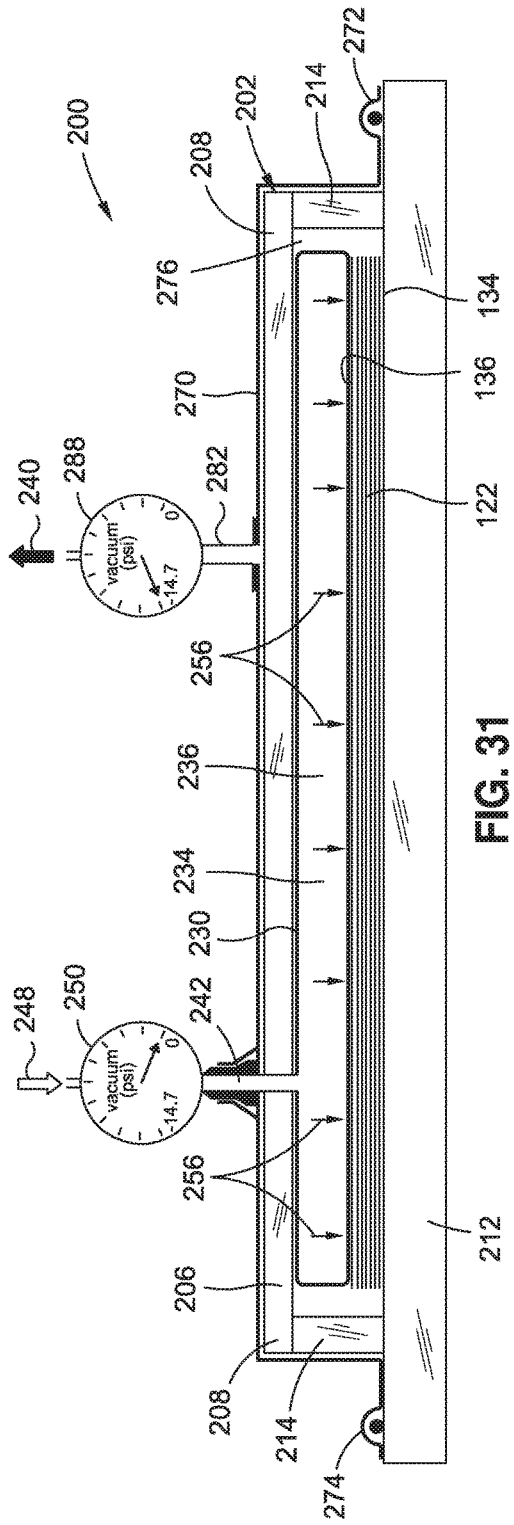

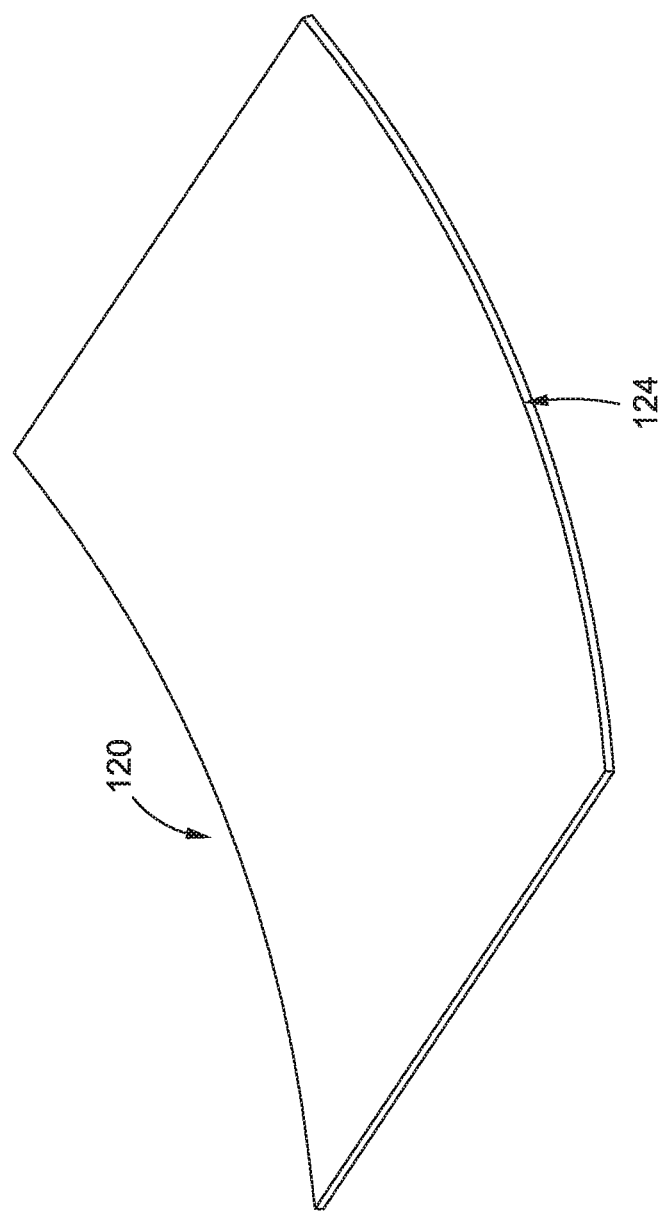

TOOLING APPARATUS AND METHOD FOR DOUBLE-VACUUM-BAG DEGASSING OF A COMPOSITE LAYUP

FIELD

The present disclosure relates generally to manufacturing composite structures and, more particularly, to a tooling apparatus and method for degassing, consolidating, and curing a composite layup in an out-of-autoclave process.

BACKGROUND

The manufacturing of fiber-reinforced composite structures may include laying up composite plies on a layup mandrel or forming tool to form a composite layup. Heat and pressure may be applied to the composite layup to consolidate and cure the composite layup into a cured composite structure. Conventional method of curing a composite layup may involve the use of an autoclave to provide heat and compaction pressure to the composite layup to achieve the desired mechanical properties in the cured composite structure. The application of compaction pressure may facilitate the degassing of the composite layup during which gas (e.g., entrapped moisture, air, and/or volatiles) may be evacuated from the composite layup to avoid porosity and achieve high strength in the cured composite structure.

Unfortunately, the use of an autoclave may require extended periods of time to heat the composite layup to the required consolidation and curing temperatures. In addition, extended periods of time may be required to cool the composite layup to ambient temperature after curing. The amount of time required to process and cure a composite layup in an autoclave may be prohibitive for large-scale production programs requiring high part-production rates. In addition, autoclaves are a significant capital cost for construction, operation, and maintenance. Furthermore, the internal size of an autoclave may limit the size of composite layups that can be processed.

As can be seen, there exists a need in the art for a system and method of manufacturing a composite structure that avoids the need for an autoclave.

SUMMARY

The above-noted needs associated with manufacturing composite structures are specifically addressed and alleviated by the present disclosure which provides a tooling apparatus for out-of-autoclave degassing, consolidating, and curing of a composite layup. The tooling apparatus may include a rigid outer tool for receiving a composite layup, a tubular inner vacuum bag in contact with the composite layup and defining an inner vacuum chamber, and an outer vacuum bag covering at least a portion of the rigid outer tool. The outer vacuum bag and the tubular inner vacuum bag may collectively define an outer vacuum chamber containing the composite layup. An outer bag vacuum source may be fluidly coupled to the outer vacuum bag for applying an outer bag vacuum pressure to the outer vacuum chamber. An inner bag vacuum source may be fluidly coupled to the tubular inner vacuum bag for applying an inner bag vacuum pressure to the inner vacuum chamber during application of the outer bag vacuum pressure to the outer vacuum chamber.

Also disclosed is a tooling apparatus having a rigid outer plate supported in spaced relation above a layup plate. The layup plate may receive a tool side of a composite layup. The tooling apparatus may include a tubular inner vacuum bag and an outer vacuum bag. The tubular inner vacuum bag may define an inner vacuum chamber and configured to be positioned between the rigid outer plate and a bag side of the composite layup. The outer vacuum bag may seal the composite layup and the tubular inner vacuum bag to the layup plate. The outer vacuum bag and the tubular inner vacuum bag may collectively define an outer vacuum chamber containing the composite layup and the tubular inner vacuum bag. An outer bag vacuum source may be fluidly coupled to the outer vacuum bag and may apply an outer bag vacuum pressure on the outer vacuum chamber. An inner bag vacuum source may be fluidly coupled to the tubular inner vacuum bag and may apply an inner bag vacuum pressure on the inner vacuum chamber during application of the outer bag vacuum pressure on the outer vacuum chamber.

Additionally, disclosed is a tooling apparatus having a clamshell mold. The clamshell mold may have a mold lower half and a mold upper half configured to respectively receive a lower skin layup and an upper skin layup and an internal element layup extending between a bag side of the lower skin layup and a bag side of the upper skin layup. The tooling apparatus may include a pair of tubular inner vacuum bags each defining an inner vacuum chamber and supported on a bag carrier and positioned between the lower skin layup and the upper skin layup and located on opposite sides of the internal element layup. The tooling apparatus may additionally include an outer vacuum bag covering at least a portion of the clamshell mold such that the outer vacuum bag and the pair of tubular inner vacuum bags collectively define an outer vacuum chamber containing the lower skin layup, the upper skin layup, and the internal element layup. Furthermore, the tooling apparatus may include an outer bag vacuum source and an inner bag vacuum source. The outer bag vacuum source may be fluidly coupled to the outer vacuum bag for controlling an outer bag vacuum pressure within the outer vacuum chamber. The inner bag vacuum source may be fluidly coupled to the tubular inner vacuum bag for controlling an inner bag vacuum pressure within the inner vacuum chamber.

Also disclosed is a method of manufacturing a composite structure. The method may include supporting a tool side of a composite layup on a rigid outer tool. In addition, the method may include positioning a tubular inner vacuum bag against a bag side of the composite layup. The tubular inner vacuum bag may have an interior defining an inner vacuum chamber. The method may also include covering, using an outer vacuum bag, at least a portion of the rigid outer tool such that the outer vacuum bag and the tubular inner vacuum bag collectively define an outer vacuum chamber containing the composite layup. Furthermore, the method may include applying an outer bag vacuum pressure to the outer vacuum chamber while applying an inner bag vacuum pressure to the inner vacuum chamber. In some examples, the inner bag vacuum pressure may be no less than the outer bag vacuum pressure. The method may further include drawing gas from the composite layup and out of the outer vacuum bag while applying the outer bag vacuum pressure and the inner bag vacuum pressure.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 6 is a perspective view of a mold lower half of a clamshell mold for laying up a lower skin layup;

FIG. 7 is a perspective view of a mold upper half of the clamshell mold for laying up an upper skin layup;

FIG. 8 is a perspective view of the mold lower half showing the positioning of radius fillers on the lower skin layup;

FIG. 9 is a perspective view of the mold lower half showing the positioning of a lower internal element layup on the lower skin layup;

FIG. 10 is an exploded perspective view of a bag carrier for positioning inside of a tubular inner vacuum bag;

FIG. 11 is a cross-sectional view taken along line 11 of FIG. 10 and illustrating pleats that may be included in the tubular inner vacuum bag;

FIG. 12 is a perspective view of the mold lower half showing the lower internal element layup and upper internal element layup wrapped around the tubular inner vacuum bag and wherein the tubular inner vacuum bag is omitted for clarity;

FIG. 13 is a cross-sectional view taken along line 13 of FIG. 12 and illustrating splices of the lower and upper internal element on opposite sides of the bag carrier;

FIG. 14 is a perspective view of the individual composite layups each wrapped around the individual bag carriers (e.g., the tubular inner vacuum bags are omitted for clarity) and positioned on the lower skin layup;

FIG. 22 is a cross-sectional view of a tooling apparatus including a clamshell mold containing a composite layup and illustrating the tubular inner vacuum bags and the outer vacuum bag open to the atmosphere;

FIG. 23 is a cross-sectional view of the tooling apparatus of FIG. 22 and illustrating the application of an inner bag vacuum pressure on the tubular inner vacuum bags causing contraction against the bag carriers and resulting in a gap between the tubular inner vacuum bags and the composite layup;

FIG. 24 is a cross-sectional view of the tooling apparatus of FIG. 22 and illustrating the application of an outer bag vacuum pressure on the outer vacuum bag during the application of the inner bag vacuum pressure on the tubular inner vacuum bags and facilitating the evacuation of gas from the composite layup and out of the outer vacuum bag;

FIG. 25 is a cross-sectional view of the tooling apparatus of FIG. 22 and illustrating the venting to atmosphere of the tubular inner vacuum bags while maintaining the outer bag vacuum pressure to the outer vacuum bag and resulting in the application of compaction pressure of the tubular inner vacuum bags on the composite layup;

FIG. 28 is a cross-sectional view of the tooling apparatus taken along line 28 of FIG. 27 and illustrating the tubular inner vacuum bag and the outer vacuum bag open to the atmosphere;

FIG. 29 is a cross-sectional view of the tooling apparatus of FIG. 27 and illustrating the application of an inner bag vacuum pressure on the tubular inner vacuum bag causing contraction thereof;

FIG. 30 is a cross-sectional view of the tooling apparatus of FIG. 27 and illustrating the application of an outer bag vacuum pressure on the outer vacuum bag while maintaining the inner bag vacuum pressure on the tubular inner vacuum bag and facilitating the evacuation of gas from the composite layup and out of the outer vacuum bag;

FIG. 31 is a cross-sectional view of the tooling apparatus of FIG. 27 and illustrating the venting to atmosphere of the tubular inner vacuum bag while maintaining the outer bag vacuum pressure on the outer vacuum bag and resulting in the application of compaction pressure of the tubular inner vacuum bag against the composite layup;

FIG. 34 is a perspective view of a contoured composite structure manufactured using the tooling apparatus illustrated in FIG. 33.

DETAILED DESCRIPTION

Figure 1:
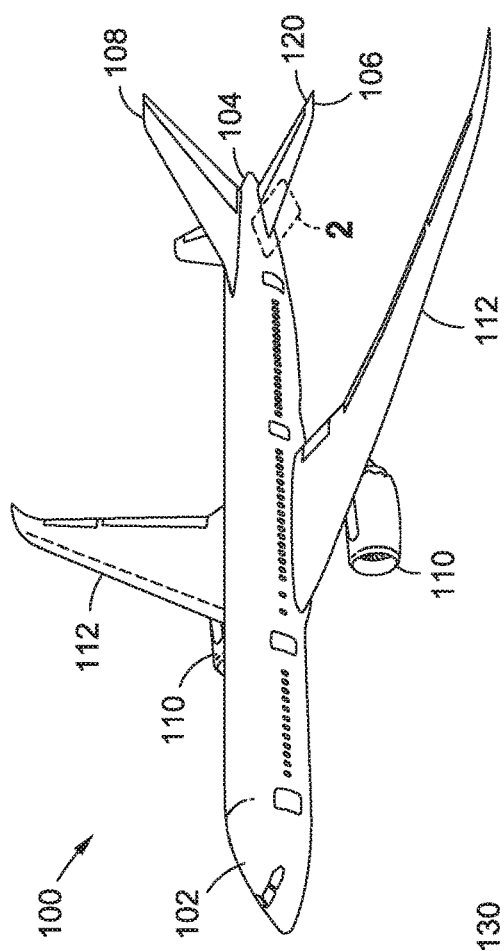
FIG. 1 is a perspective view of an aircraft

Referring now to the drawings wherein the showings are for purposes of illustrating various embodiments of the present disclosure, shown in FIG. 1 is an illustration of an aircraft 100 which may include one or more composite structures 120 that may be manufactured using one or more examples of the tooling apparatus 200 (e.g., FIGS. 3, 4, and 26) and method 400 (e.g., FIG. 20) disclosed herein. The aircraft 100 may include a fuselage 102 having a nose at a forward end, and an empennage 104 at an aft end. The empennage 104 may include a vertical tail 108 and one or more horizontal tails 106. In addition, the aircraft 100 may include a pair of wings 112 extending outwardly from the fuselage 102. One or more propulsion units 110 may be included with the aircraft 100. For example, the propulsion units 110 may be supported on the wings 112. The fuselage 102, the wings 112, the vertical tail 108, the horizontal tails 106, and other aircraft components may be formed as composite structures 120.

Although FIG. 1 represents a commercial aircraft 100, the tooling apparatus 200 (FIG. 3) and/or method 400 disclosed herein may be implemented for manufacturing composite structures 120 for any type of aircraft including commercial, civilian, and military aircraft including fixed-wing aircraft, rotary-wing aircraft, and any one a variety of other types of air vehicles. Furthermore, the tooling apparatus 200 and method 400 may be implemented for manufacturing composite structures 120 that may be used on space vehicles including, but not limited to, missiles, rockets, launch vehicles, satellites, and other vehicles and assemblies. In addition, the tooling apparatus 200 and/or method may be implemented for manufacturing composite structures 120 for land-based vehicles and/or marine vessels. In this regard, the tooling apparatus 200 and/or method 400 may be implemented for forming composite structures 120 for any type of vehicular or non-vehicular application, without limitation, including any type of system, subsystem, assembly, subassembly, or structure, and may further include composite structures for buildings and other land-based structures.

Figure 2:
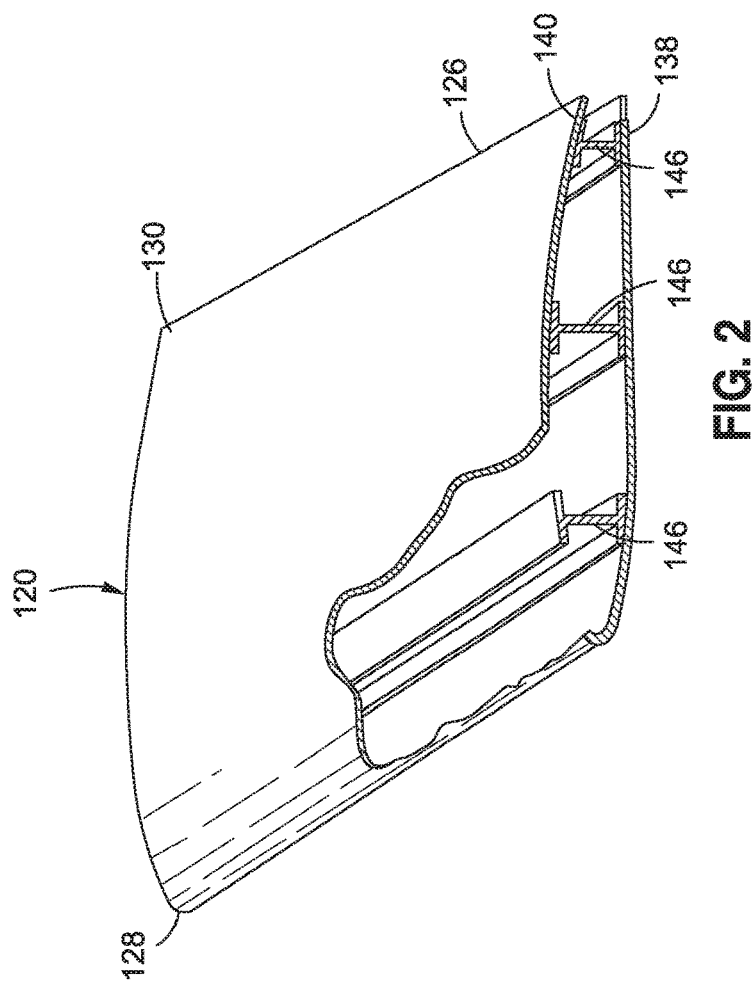
FIG. 2 is a perspective illustration of a portion of a horizontal tail formed as a composite structure.

Referring to FIG. 2, shown is a perspective view of a horizontal tail 106 (FIG. 1) representative of a composite structure 120 that may be manufactured using the tooling apparatus 200 and method 400 disclosed herein. The horizontal tail 106 has an airfoil-shaped cross-section 126 including a leading edge 128 and an aft edge or trailing edge 130 to which a fixed trailing edge surface (not shown) or a movable control surface (not shown) may be attached. In the example shown, the composite structure 120 may include an upper skin and a lower skin, each of which may be formed as a composite layup 122 of composite plies (not shown). The horizontal tail 106 may include one or more internal components which may also be formed of one or more composite plies. In the example shown, the internal components are configured as spars 146 extending between the upper skin and lower skin and may be co-cured with the upper skin and lower skin using the tooling apparatus 200 and method 400 disclosed herein.

Figure 3:
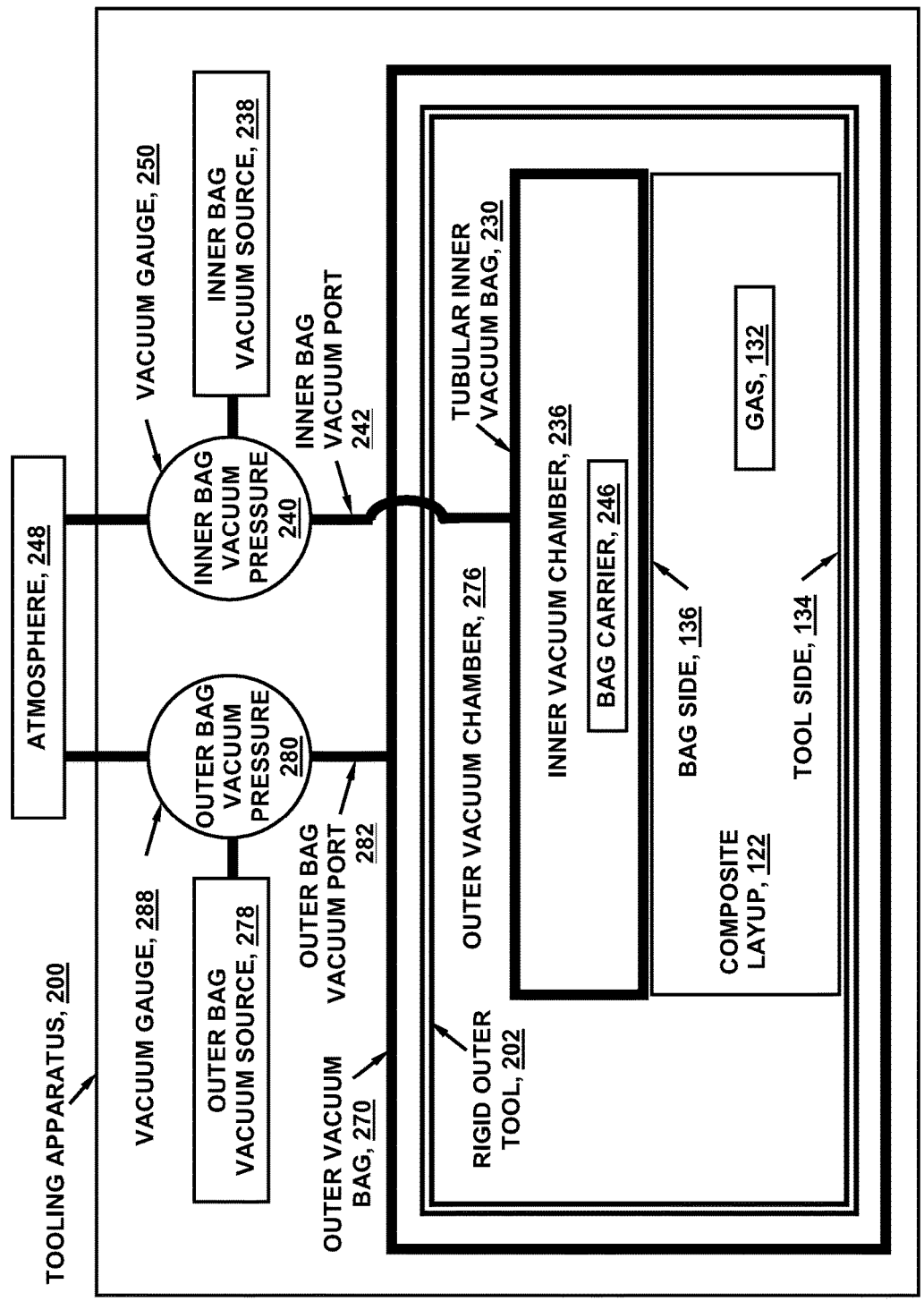
FIG. 3 is a block diagram of an example of a tooling apparatus for manufacturing a composite structure and which may include a rigid outer tool, a tubular inner vacuum bag, and an outer vacuum bag.

In the present disclosure, a composite layup 122 (FIG. 5) may be formed of one or more composite plies (e.g., FIGS. 2 and 3). The composite plies may be comprised of fiber-reinforced polymer matrix material. The polymer matrix material or resin may be a thermoplastic matrix material or the resin may be a thermosetting matrix material. In addition, the resin may be curable by heating to an elevated temperature, or the resin may be a room-temperature-curable resin. The fibers may be provided in any one of a variety different configurations including continuous, unidirectional, bidirectional, woven, chopped, and other fiber configurations. The fibers may be formed of carbon, glass, aramid, metal, and/or any other fiber material or combination thereof. In some examples, the composite plies may be prepreg composite plies containing fibers pre-impregnated with polymer matrix material. For example, the composite plies may include carbon fibers preimpregnated with an epoxy matrix.

As mentioned above, the composite layup 122 may be formed of prepreg composite plies that are room-temperature-curable. For example, a composite layup 122 may be formed of prepreg plies configured to cure for a defined time period at room temperature under vacuum. The tooling apparatus 200 and below-described method 400 may be implemented to degas such a composite layup 122 for some portion of the defined time period of the room temperature cure cycle, after which an outer bag vacuum pressure 280 may be applied to the outer vacuum bag 270 while venting the tubular inner vacuum bag 230 to atmosphere 248 as described below to apply compaction pressure 256 to the composite layup 122 to complete consolidation and cure the composite layup 122.

Referring to FIG. 3, an example of a tooling apparatus 200 may include a rigid outer tool 202, one or more tubular inner vacuum bags 230, and an outer vacuum bag 270. The rigid outer tool 202 may be configured to receive a tool side 134 of an uncured composite layup 122 which, in an example, may be formed of prepreg composite plies. The inner surface 204 of the rigid outer tool 202 may be in direct physical contact with the composite layup 122. Alternatively, the inner surface 204 of the rigid outer tool 202 may be placed in non-direct contact with the composite layup 122. For example, a release film may be placed between the rigid outer tool 202 and the composite layup 122 to prevent the matrix material from bonding to the inner surface 204 of the rigid outer tool 202.

The one or more tubular inner vacuum bags 230 (FIG. 3) may be placed in contact with a bag side 136 of the composite layup 122. A tubular inner vacuum bag 230 may have an interior 234 (FIG. 3) defining an inner vacuum chamber 236. The composite layup 122 may be located outside of the inner vacuum chamber 236. The tubular inner vacuum bag 230 may be formed of a material that is non-porous or impermeable. In some examples, the tubular inner vacuum bag 230 may be formed of a non-elastic material (e.g., Nylon'), and may optionally include pleats 232 (FIG. 11) to allow the tubular inner vacuum bag 230 to expand and conform to the contour of the bag side 136 of the composite layup 122. In other examples, the tubular inner vacuum bag 230 may be formed of an impermeable or non-porous material that is stretchable or elastic such as rubber.

In FIG. 3, the outer vacuum bag 270 may cover at least a portion of the rigid outer tool 202. The one or more tubular inner vacuum bags 230 may extend out of the outer vacuum bag 270 and may be fluidly coupled to an inner bag vacuum source 238. The outer vacuum bag 270 may be sealed to each one of the tubular inner vacuum bags 230 at the location where the tubular inner vacuum bag 230 extends out of the outer vacuum bag 270. The outer vacuum bag 270 and the tubular inner vacuum bag 230 collectively define an outer vacuum chamber 276 containing the composite layup 122 and at least a portion of the rigid outer tool 202. The outer vacuum chamber 276 may be a single contiguous volume defined as the space between the one or more tubular inner vacuum bags 230 and the volume enclosed or sealed by the outer vacuum bag 270.

The tooling apparatus 200 may include an outer bag vacuum source 278 fluidly coupled to the outer vacuum bag 270 (FIG. 3) and configured to apply an outer bag vacuum pressure 280 to the outer vacuum chamber 276. Likewise, the tooling apparatus 200 may include an inner bag vacuum source 238 (FIG. 3) fluidly coupled to the one or more tubular inner vacuum bags 230 and configured to apply an inner bag vacuum pressure 240 to the one or more inner vacuum chambers 236. The inner bag vacuum pressure 240 may be applied during the application of the outer bag vacuum pressure 280 (FIG. 3) on the outer vacuum chamber 276. The inner bag vacuum source 238 and/or the outer bag vacuum source 278 may be provided as a vacuum pump (not shown) or any other device capable of drawing vacuum pressure on the respective inner vacuum chamber 236 and outer vacuum chamber 276.

Referring still to FIG. 3, the tooling apparatus 200 may include at least one bag carrier 246 which may be positioned inside a tubular inner vacuum bag 230 to provide support for the tubular inner vacuum bag 230. A bag carrier 246 may have a cross-sectional size and a cross-sectional shape that may be complementary to the cross-sectional size and cross-sectional shape of the bag side 136 of the composite layup 122 adjacent to which the tubular inner vacuum bag 230 may be positioned. The bag carrier 246 cross-sectional size may be slightly smaller than the cross-sectional size of the bag side 136 of the composite layup 122 to accommodate the thickness of the tubular inner vacuum bag 230 and any additional layers (not shown) that may be included with the tubular inner vacuum bag 230. For example, a breather layer (not shown), a bleeder layer (not shown), a release film (not shown), one or more layers of peel ply (not shown), and/or other materials (not shown) may be included between the composite layup 122 and the tubular inner vacuum bag 230 to facilitate the degassing, consolidation, and curing of the composite layup 122. In addition, the bag carrier 246 cross-sectional size may be such that when inner bag vacuum pressure 240 is applied to the tubular inner vacuum bag 230, a gap 254 (e.g., FIG. 23) is formed between the bag side 136 of the composite layup 122 and the tubular inner vacuum bag 230. As described in greater detail below, the gap 254 may provide a pathway for the evacuation of gases from the composite layup 122 during the degassing process described in greater detail below.

The bag carrier 246 may also support the tubular inner vacuum bag 230 such as during assembly of the composite layup 122. For example, the bag carrier 246 may support the tubular inner vacuum bag 230 while positioning the tubular inner vacuum bag 230 adjacent to a bag side 136 of the composite layup 122 during the layup assembly process. The bag carrier 246 may also support the tubular inner vacuum bag 230 during application of the inner bag vacuum pressure 240 on the inner vacuum chamber 236. The inner vacuum chamber 236 may be defined as the space between the tubular inner vacuum bag 230 and the bag carrier 246. The bag carrier 246 may support the tubular inner vacuum bag 230 during contraction 252 of the tubular inner vacuum bag 230 as a result of the application of the inner bag vacuum pressure 240. The bag carrier 246 may maintain the cross-sectional shape of the tubular inner vacuum bag 230 and prevent collapsing of the tubular inner vacuum bag 230 onto itself during the application of the inner bag vacuum pressure 240 on the inner vacuum chamber 236.

In some examples, the bag carrier 246 may also act as a layup mandrel for forming an internal composite layup 122 (FIG. 3) that may be assembled with one or more skin layups prior to degassing and curing, as described in greater detail below. The bag carrier 246 (FIG. 4) may be formed of any material including metallic material and/or nonmetallic material such as composite material (e.g., carbon fiber). The bag carrier 246 may be configured to withstand the elevated temperatures and pressures associated with autoclave curing. In addition, the bag carrier 246 may be formed of a material that provides a high level of durability for use of the bag carrier 246 over multiple cure cycles to allow production of multiple copies of a cured composite structure 120. In one example, the bag carrier 246 may be formed as a foam mandrel. The bag carrier 246 may be solid. However, in some examples, the bag carrier 246 may have a hollow interior (not shown) to allow for the flow of hot air (not shown) along the length of the interior of the bag carrier 246 to promote uniform heating of the bag side 136 of the composite layup 122 during degassing, consolidation, and/or curing.

Figure 4:
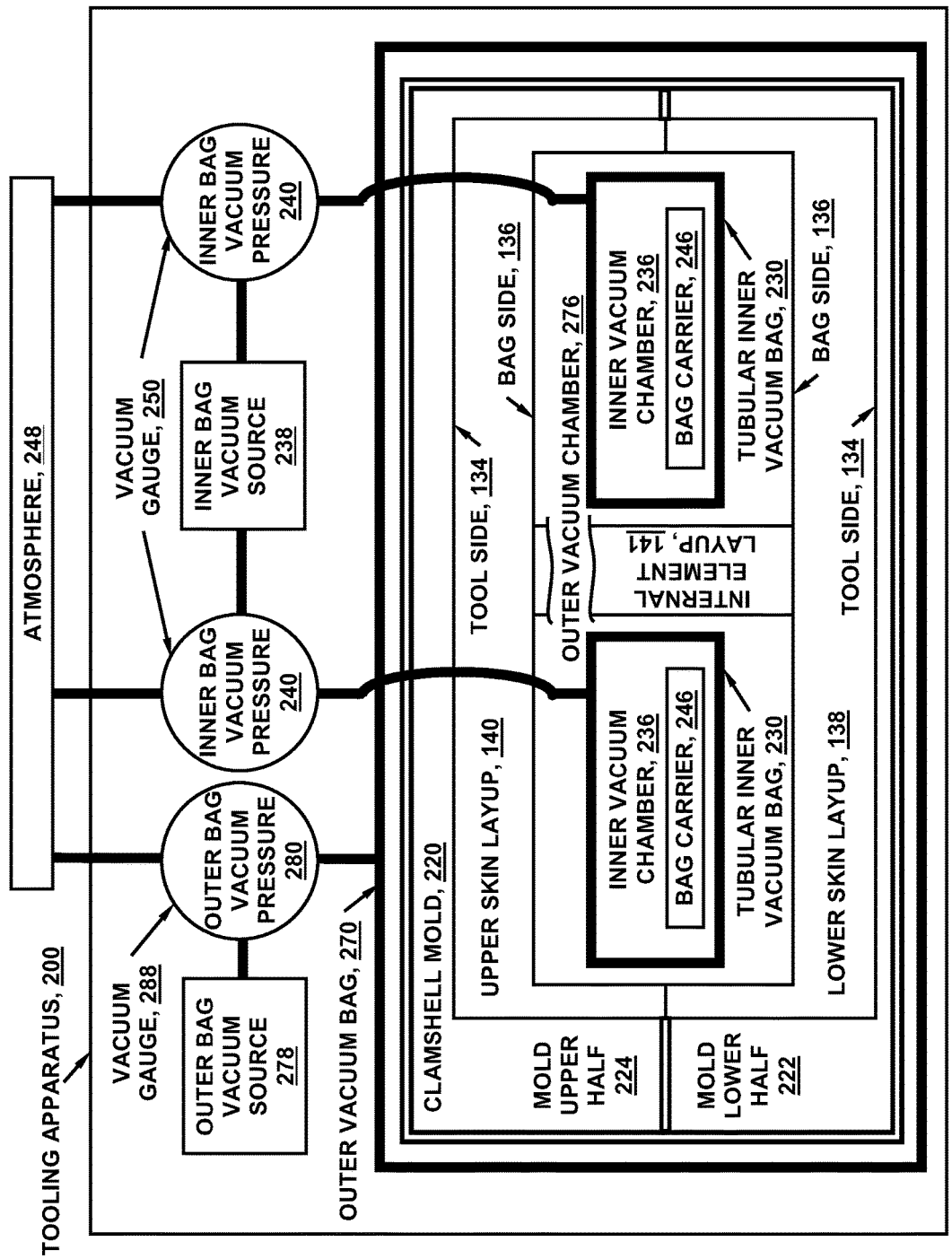
FIG. 4 is a block diagram of a further example of a tooling apparatus wherein the rigid outer tool is configured as a clamshell mold.

FIG. 4 is an example of a tooling apparatus 200 wherein the rigid outer tool 202 is configured as a clamshell mold 220. The clamshell mold 220 may include a mold lower half 222 and a mold upper half 224. The mold lower half 222 and/or the mold upper half 224 may be configured to receive one or more composite layups 122. For example, the mold lower half 222 may be configured to receive a lower skin layup 138 formed of one or more composite plies which may be laid up on the inner surface 204 of the mold lower half 222. Likewise, the mold upper half 224 may be configured to receive an upper skin layup 140 which may also be formed of one or more composite plies. In the example shown, the tooling apparatus 200 may include one or more tubular inner vacuum bags 230 each supported on a bag carrier 246 and positioned within the composite layup 122 between the bag side 136 of the lower skin layup 138 and the bag side 136 of the upper skin layup 140 when the mold lower half 222 and the mold upper half 224 are mated together along a mating joint 226. When the mold lower half 222 and mold upper half 224 are mated together, the clamshell mold 220 may enclose at least the composite layup 122 and one or more tubular inner vacuum bags 230, one or more of which may be supported on a bag carrier 246.

Referring still to FIG. 4, the outer vacuum bag 270 may enclose or envelope (e.g., FIG. 5) the clamshell mold 220 containing the composite layup 122 (FIG. 3), the bag carrier 246 and the tubular inner vacuum bag 230. In other examples, the outer vacuum bag 270 may cover a portion of the rigid outer tool 202 (FIG. 3) such as along a mating joint 226 of the clamshell mold 220 (e.g., FIG. 8) to seal at least the composite layup 122, one or more tubular inner vacuum bags 230, and the bag carriers 246 within the outer vacuum chamber 276. Regardless of whether the outer vacuum bag 270 encloses the clamshell mold 220 or is sealed along portions (e.g., the mating joint 226) of the clamshell mold 220, the outer vacuum bag 270 may be fluidly coupled to an outer bag vacuum source 278 for drawing an outer bag vacuum pressure 280 on the outer vacuum bag 270. The one or more tubular inner vacuum bags 230 may be fluidly coupled to one or more inner bag vacuum sources 238.

In FIG. 4, the clamshell mold 220 is shown including a pair of bag carriers 246 each supporting a tubular inner vacuum bag 230. As indicated above, each one of the tubular inner vacuum bags 230 may define an inner vacuum chamber 236. In some examples, one or more composite internal element layups 141 may be included for consolidation and co-curing with the skin layups. For example, an internal element layup 141 may be configured as an integral stiffening element such as a spar 146 extending along at least a portion of the length of the upper and lower skin layups 138, 140. The internal element layup 141 (e.g., spar) may interconnect the bag side 136 of the upper skin layup 140 with the bag side 136 of the lower skin layup 138. A pair of tubular inner vacuum bags 230 may be positioned on opposite sides of each composite internal element layup 141. Each one of the tubular inner vacuum bags 230 may define an inner vacuum chamber 236 which may be fluidly coupled to an inner bag vacuum source 238. The internal element layup 141 may have opposing bag sides 136 configured to be compacted by the opposing tubular inner vacuum bags 230 during the application of the outer bag vacuum pressure 280 on the outer vacuum chamber 276 when the inner vacuum chambers 236 are vented to atmosphere 248, as described in greater detail below.

Figure 5:
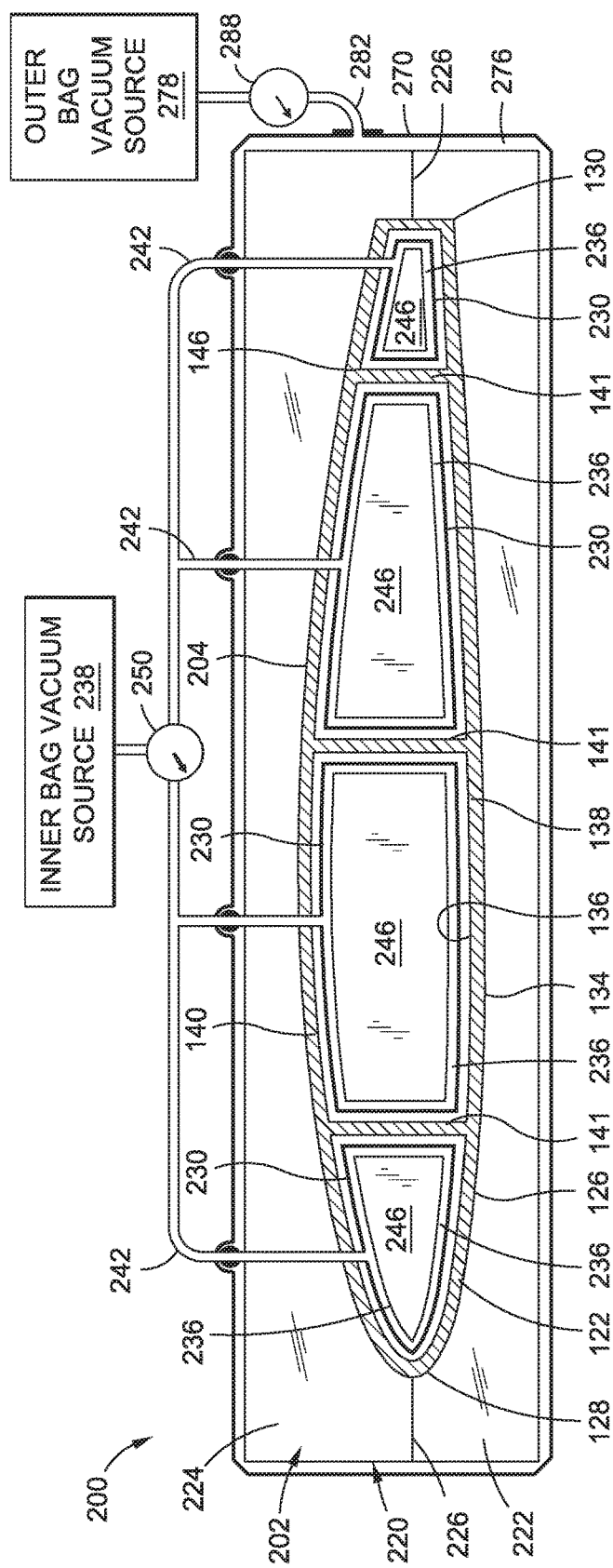
FIG. 5 is a cross-sectional view of a clamshell mold configured for degassing, consolidating, and curing a composite layup having an airfoil-shaped cross-section.

Referring to FIG. 5, the composite layup 122 is shown having an airfoil-shaped cross-section 126 including a leading edge 128 and a trailing edge 130. The mating joint 226 of the mold upper half 224 and mold lower half 222 may be located adjacent to the leading edge 128 and the trailing edge 130. However, the mating joint 226 of the clamshell mold 220 may be positioned at any location, and is not limited to a location adjacent to the leading edge 128 and/or trailing edge 130 of a composite layup 122. In addition, the mating joint 226 of the clamshell mold 220 is not limited to being oriented along a horizontal plane as shown in FIG. 5, but may be vertically-oriented, or at any other angle. Furthermore, the clamshell mold 220 may be configured for forming a composite layup 122 of any cross-sectional size and shape, without limitation, and is not limited to an airfoil-shaped cross-section 126 as shown in FIG. 5. For example, the presently-described tooling apparatus 200 (e.g., the clamshell mold 220) and method 400 may be configured for manufacturing (e.g., including degassing, consolidating, and curing) a composite bicycle frame, a baseball bat or other sporting implement, or for manufacturing any type of composite structure of any size, shape, and configuration. As described in greater detail below with regard to FIGS. 26-31 showing the tooling apparatus 200 configured as a rigid outer plate 206 supported over a layup plate 212, the presently-described tooling apparatus 200 and method 400 may be implemented for manufacturing relatively large composite structures such as a composite fuselage frame.

In FIG. 5, the composite layup 122 includes an upper skin layup 140 and a lower skin layup 138 positioned against the inner surface 204 of the respective mold upper half 224 and mold lower half 222. In addition, the composite layup 122 is shown having three generally vertically-oriented internal element layups 141 (e.g., spars 146) interconnecting the upper skin layup 140 to the lower skin layup 138. The composite layup 122 may include any number of internal element layups 141 in any size, shape, and configuration, and is not limited to internal element layups 141 extending between the upper skin layup 140 and lower skin layup 138. For example, although not shown, one or more internal element layups 141 may be positioned against the upper skin layup 140 and not the lower skin layup 138. Alternatively or additionally, one or more internal element layups 141 may be positioned against the lower skin layup 138 and not the upper skin layup 140. The internal element layup 141 is not limited to a generally planar-shaped, vertically-oriented configuration as shown in FIG. 5, and may include any number of different cross-sectional shapes (not shown) including, but not limited to, a blade section, a hat section, a C-section, a J-section, and any number of other cross-sectional shapes that may be positioned against the upper skin layup 140 and/or the lower skin layup 138.

Figure 15:
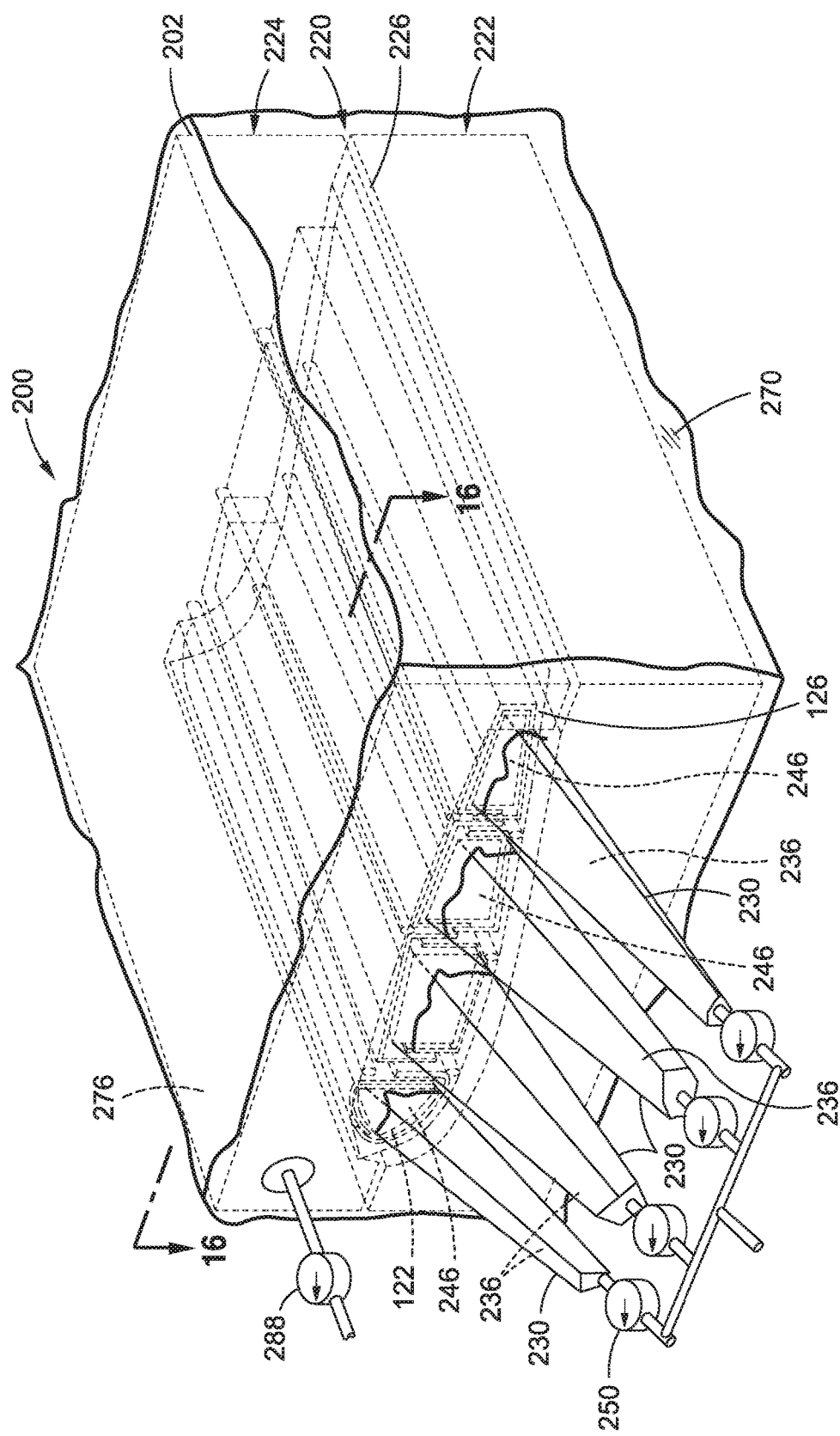
FIG. 15 is a perspective view of the upper and lower mold halves mated together and enclosed by an outer vacuum bag which is sealed to the individual tubular inner vacuum bags.

In FIG. 5, a tubular inner vacuum bag 230 is positioned on opposite sides of each one of the composite internal element layups 141. Each one of the tubular inner vacuum bags 230 may be supported by a bag carrier 246 having a cross-sectional shape that is complementary to the cross-sectional shape collectively defined by the inner element layup 141, the upper skin layup 140, and the lower skin layup 138. Each one of the tubular inner vacuum bags 230 extends out of the outer vacuum bag 270 which is sealed to each tubular inner vacuum bag 230 as shown in FIG. 15. The tubular inner vacuum bags 230 may be fluidly coupled by respective inner bag vacuum ports 242 to at least one inner bag vacuum source 238. One or more vacuum gauges 250 may be included to monitor the vacuum pressure in the tubular inner vacuum bags 230. The outer vacuum bag 270 may be fluidly coupled to an outer bag vacuum source 278 by an outer bag vacuum port 282. A vacuum gauge 288 may be included to monitor the vacuum pressure in the outer vacuum bag 270.

Referring to FIGS. 6-16, shown is an example of a sequence of assembling and encapsulating a composite layup 122 in a clamshell mold 220 for degassing, consolidation, and curing of the composite layup 122. FIG. 6 illustrates the layup or positioning of a lower skin layup 138 on the inner surface 204 of the mold lower half 222 of the clamshell mold 220. At the leading edge 128 and trailing edge 130, the edges of the lower skin layup 138 may extend beyond the mating joint 226 to facilitate the formation of a scarf joint with the plies of the upper skin layup 140. FIG. 7 illustrates the layup or positioning of an upper skin layup 140 on the inner surface 204 of the upper skin mold of the clamshell mold 220. The edges of the upper skin layup 140 may be staggered and/or shortened at the leading edge 128 and trailing edge 130 to facilitate the formation of the scarf joint with the edges of the lower skin layup 138.

FIG. 8 illustrates the layup of radius fillers 148 (e.g., noodles) on the bag side 136 (FIG. 5) of the lower skin layup 138. The radius fillers 148 may fill a lengthwise notch (not shown) that may occur at the interface of each one of the internal element layups 141 (e.g., spars 146) with a skin layup. The radius fillers 148 may be formed of any suitable composite material such as a bundle of unidirectional fiber tows, a laminated stack of composite plies, or any other suitable radius filler configuration. FIG. 9 illustrates the layup of a lower internal element layup 142 between a pair of radius fillers 148. The lower internal element layup 142 may be formed as one or more composite plies. The composite plies of the lower internal element layup 142 may have staggered edges (not shown) to form a scarf joint (not shown) with the staggered edges of an upper internal element layup 144 (FIG. 13).

FIG. 10 illustrates the assembly of a tubular inner vacuum bag 230 with a bag carrier 246. The bag carrier 246 may be positioned in the interior 234 of the tubular inner vacuum bag 230. The tubular inner vacuum bag 230 may have a length that is longer than the bag carrier 246 to allow the tubular inner vacuum bag 230 to extend outside of the outer vacuum bag 270 on at least one end of the outer vacuum bag 270, as shown in FIG. 15 and described in greater detail below. As indicated above, the tubular inner vacuum bag 230 is preferably formed of a non-porous material such as Nylon™. The bag carrier 246 may be solid or hollow. For example, the bag carrier 246 may be formed as a foam mandrel having a cross-sectional shape that approximates the cross-sectional shape of the composite layup 122 (FIG. 9).

The bag carrier 246 may function to maintain the general cross-sectional shape of the composite internal element layup 141 (e.g., spars 146) during the assembly of the composite laminate and during the one or more stages of consolidation and/or curing of the internal element layup 141 with the upper skin layup 140 and lower skin layup 138 (FIG. 12). In this regard, the bag carrier 246 may have a cross-sectional size that is slightly smaller than the cross-sectional size of the bag sides of the composite layup. The bag carrier 246 may have a cross-sectional size and shape that allows for the formation of a gap 254 (e.g. see FIGS. 23-24) between the tubular inner vacuum bag 230 and the bag sides 136 of the upper skin layup 140, the lower skin layup 138, and the internal element layups 141. As described in greater detail below, the gap 254 may facilitate the evacuation of gas 132 from the composite layup 122 during degassing and curing of the composite layup 122.

FIG. 11 illustrates a cross-section of the tubular inner vacuum bag 230/bag carrier 246 and showing pleats 232 that may be optionally included in the tubular inner vacuum bag 230. In the example shown, the pleats 232 may be formed at one or more of the corners of the bag carrier 246. The pleats 232 may allow the tubular inner vacuum bag 230 to expand under an inner bag vacuum pressure 240 to allow the tubular inner vacuum bag 230 to conform (e.g., see FIG. 25) to the contours of the cross-sectional shape defined by the upper skin layup 140, the lower skin layup 138, and the optionally-included internal element layups 141 (FIG. 12).

FIG. 12 illustrates the lower internal element layup 142 and upper internal element layup 144 wrapped around the tubular inner vacuum bag 230 (FIG. 10). The tubular inner vacuum bag 230 is omitted from FIG. 12 for clarity. As shown in FIG. 13, the lower internal element layup 142 and upper internal element layup 144 may be joined to one another along a lengthwise splice 150 joints to allow for expansion of the composite plies when an inner bag vacuum pressure 240 (FIG. 4) is applied to the tubular inner vacuum bag 230.

FIG. 14 illustrates the assembly of the internal element layups 141 with the upper skin layup 140 and lower skin layup 138 of the airfoil-shaped composite layup 122. As indicated above, each one of the internal element layups may be supported on a tubular inner vacuum bag 230 which, in turn, may be supported on a bag carrier 246. Between each one of the internal element layups 141, a radius filler 148 may be installed against the bag side 136 (FIG. 7) of the upper skin layup 140 and against the lower skin layup 138.

FIG. 15 illustrates the mold upper half 224 mated to the mold lower half 222 of the clamshell mold 220. The clamshell mold 220 may be enclosed by an outer vacuum bag 270. As can be seen, each one of the tubular inner vacuum bags 230 protrudes through the outer vacuum bag 270 on at least one end of the clamshell mold 220. In the example shown, each one of the tubular inner vacuum bags 230 is supported by a bag carrier 246. Each one of the tubular inner vacuum bags 230 forms an inner vacuum chamber 236 collectively defined as the space between the tubular inner vacuum bag 230 and the bag carrier 246. The outer vacuum bag 270 is sealed to each one of the individual tubular inner vacuum bags 230 at the location where the tubular inner vacuum bags 230 protrude out of the outer vacuum bag 270. Each one of the tubular inner vacuum bags 230 may be fluidly coupled via a inner bag vacuum port 242 to an inner bag vacuum source 238 (FIG. 5). Likewise, the outer vacuum bag 270 may be fluidly coupled via an outer bag vacuum port 282 (FIG. 16) to an outer bag vacuum source 278.

Figure 16:
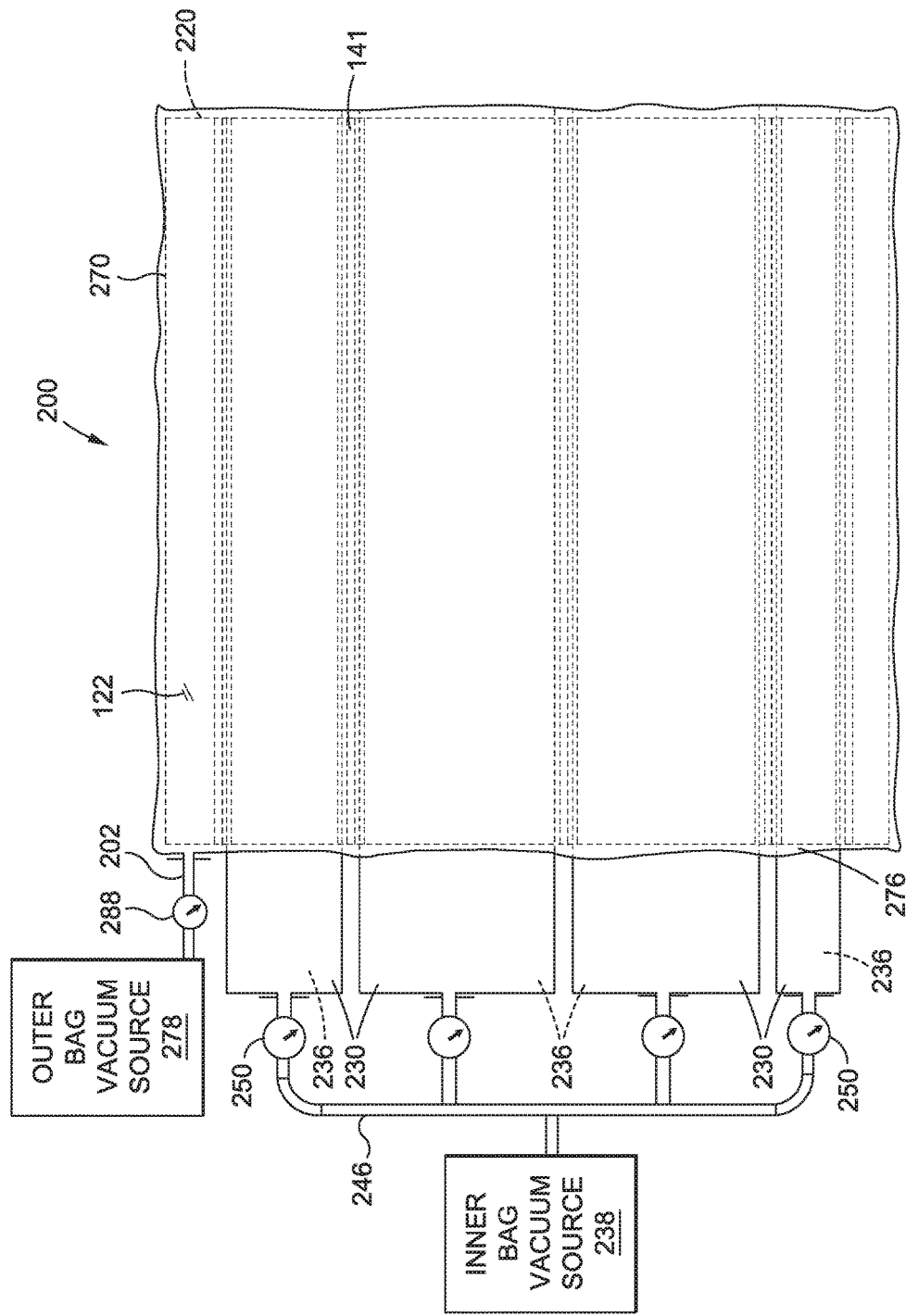
FIG. 16 is a top view of the assembly shown in FIG. 15.

FIG. 16 is a top view of the assembly shown in FIG. 15 illustrating the protrusion of the tubular inner vacuum bags 230 out of the outer vacuum bag 270. Also shown are the tubular inner vacuum bags 230 which may each be supported by a bag carrier 246 (FIG. 15) and defining an inner vacuum chamber 236. As indicated earlier, the outer vacuum bag 270 and the tubular inner vacuum bags 230 collectively define a contiguous outer vacuum chamber 276 which may contain the composite layup 122 and the rigid outer tool 202. The outer vacuum chamber 276 may be defined as the space between the tubular inner vacuum bags 230 and the volume sealed by the outer vacuum bag 270.

Figure 17:
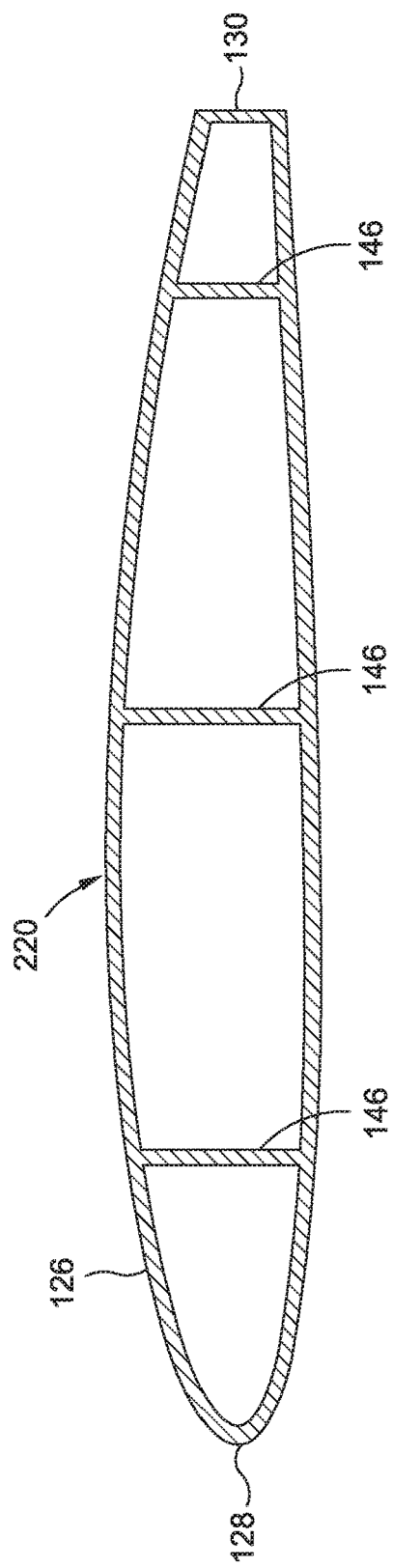
FIG. 17 is a cross-sectional view of a cured composite structure manufactured using the tooling apparatus disclosed herein.

FIG. 17 is a cross-sectional view of an airfoil-shaped cured composite structure 120 that may be manufactured using the tooling apparatus 200 illustrated in FIGS. 6-16. Included are the internal element layups 141 (FIG. 16) which may be degassed, consolidated, and co-cured with the upper skin layup 140 and lower skin layup 138 (FIG. 14). The cured composite structure 120 (FIG. 2) is advantageously formed as a single, monolithic, unitary composite structure 120 avoiding the need for mechanical fasteners conventionally used for coupling the internal elements (e.g., spars) to an upper skin and a lower skin.

Figure 18:
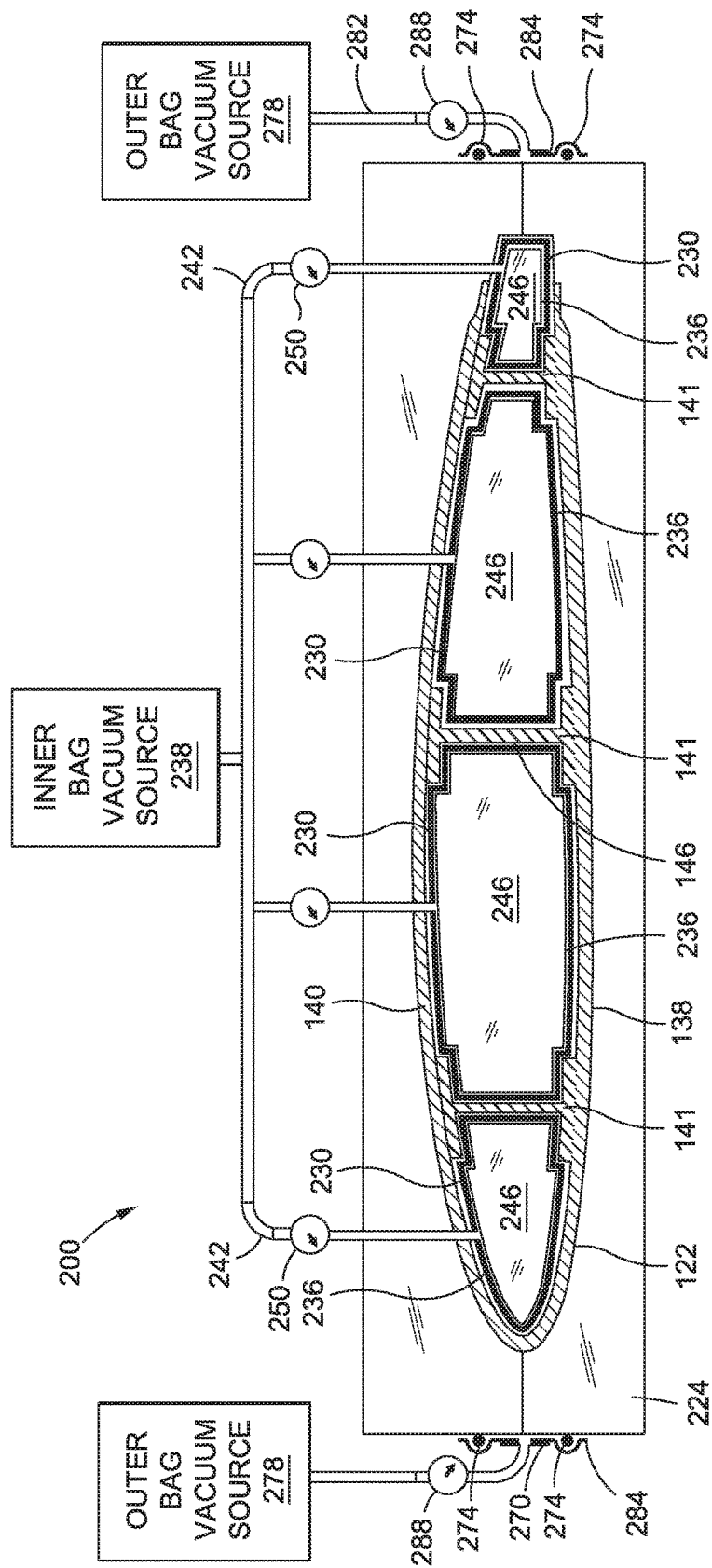
FIG. 18 is a cross-sectional view of an example of a clamshell mold wherein the outer vacuum bag comprises outer bag side strips applied over the mating joint on each side of the clamshell mold.

FIG. 18 illustrates an example of a clamshell mold 220 (FIG. 17) wherein the outer vacuum bag 270 comprises outer bag side strips 284 applied over the mating joints 226 on each side of the clamshell mold 220. One or both of the outer bag side strips 284 may be fluidly coupled via an outer bag vacuum port 282 to one or more outer bag vacuum sources 278. FIG. 18 also illustrates an alternative embodiment of the internal element layups 141 (e.g., composite spars) having an I-beam cross-section and interconnecting the upper skin layup 140 with the lower skin layup 138. The bag carriers 246 and tubular inner vacuum bags 230 may have a cross-sectional size and shape that is complementary to the I-beam cross-sectional shape of the internal element layups 141.

Figure 19:
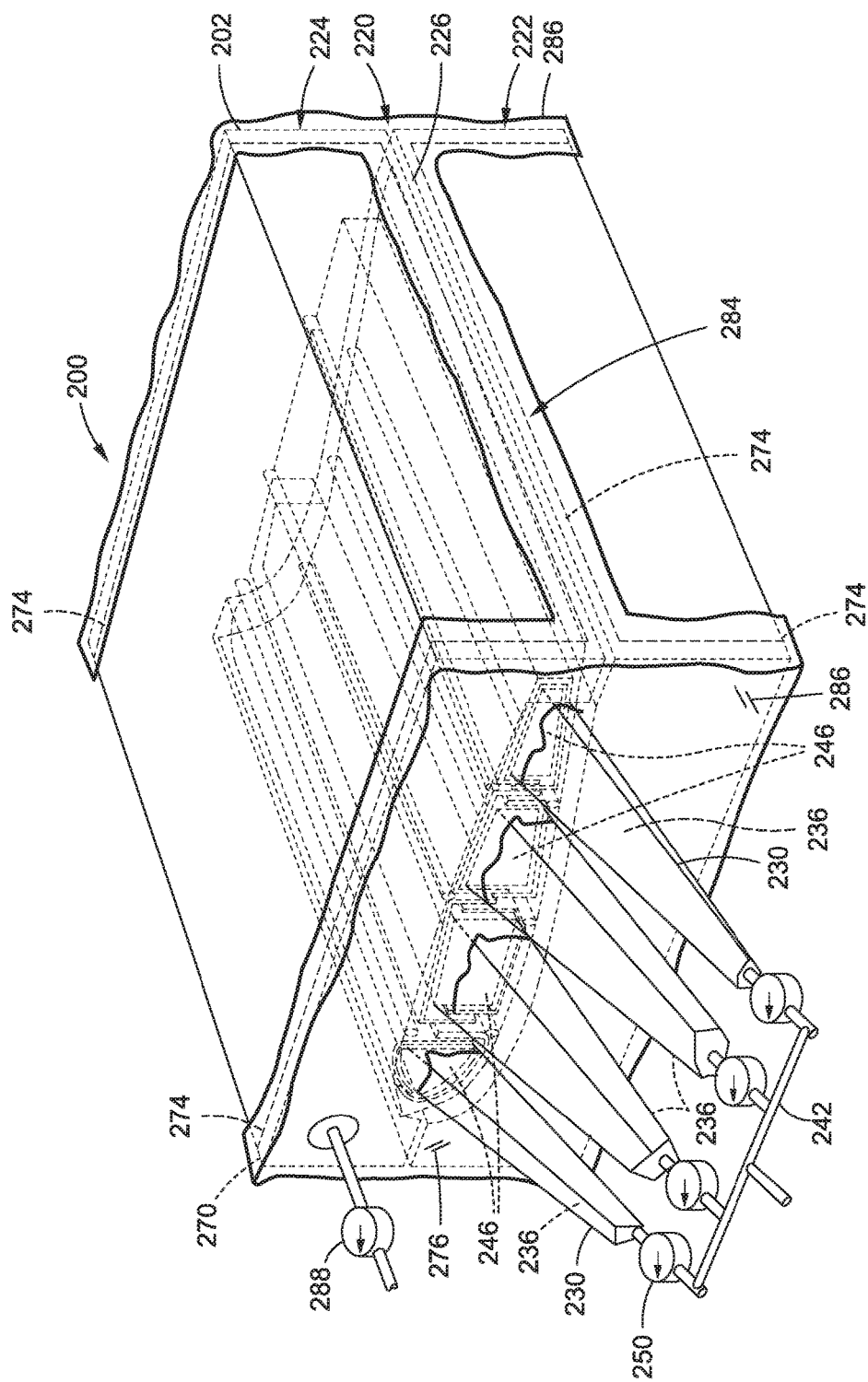
FIG. 19 is a perspective view of the tooling apparatus of FIG. 18 and illustrating the outer bag side strips sealed along the mating joint on each side of the clamshell mold and further illustrating outer bag end panels sealed to the opposing ends of the clamshell mold.

FIG. 19 is a perspective view of the tooling apparatus 200 of FIG. 18 showing the outer bag side strips 284 on each side of the clamshell mold 220. Also shown are outer bag end panels 286 sealed to the opposing ends of the clamshell mold 220 such as by using bag sealant 274. The outer bag end panels 286 and the outer bag side strips 284 collectively seal the composite layup 122 inside the clamshell mold 220. The outer bag end panels 286 may be sealed to the tubular inner vacuum bags 230 that may protrude from at least one end of the clamshell mold 220. It should be noted that the rigid outer tool 202 is not limited to a clamshell mold 220 open on opposing ends and sealed by an outer vacuum bag 270 covering the ends of the clamshell mold 220. For example, the clamshell mold 220 may be open on one end and closed on an opposite end. The tubular inner vacuum bags 230 may extend out of the open end of the clamshell mold 220 and may be sealed by to an outer vacuum bag 270 (e.g., FIG. 15) or outer bag end panel 286 (e.g., FIG. 19).

Figure 20:
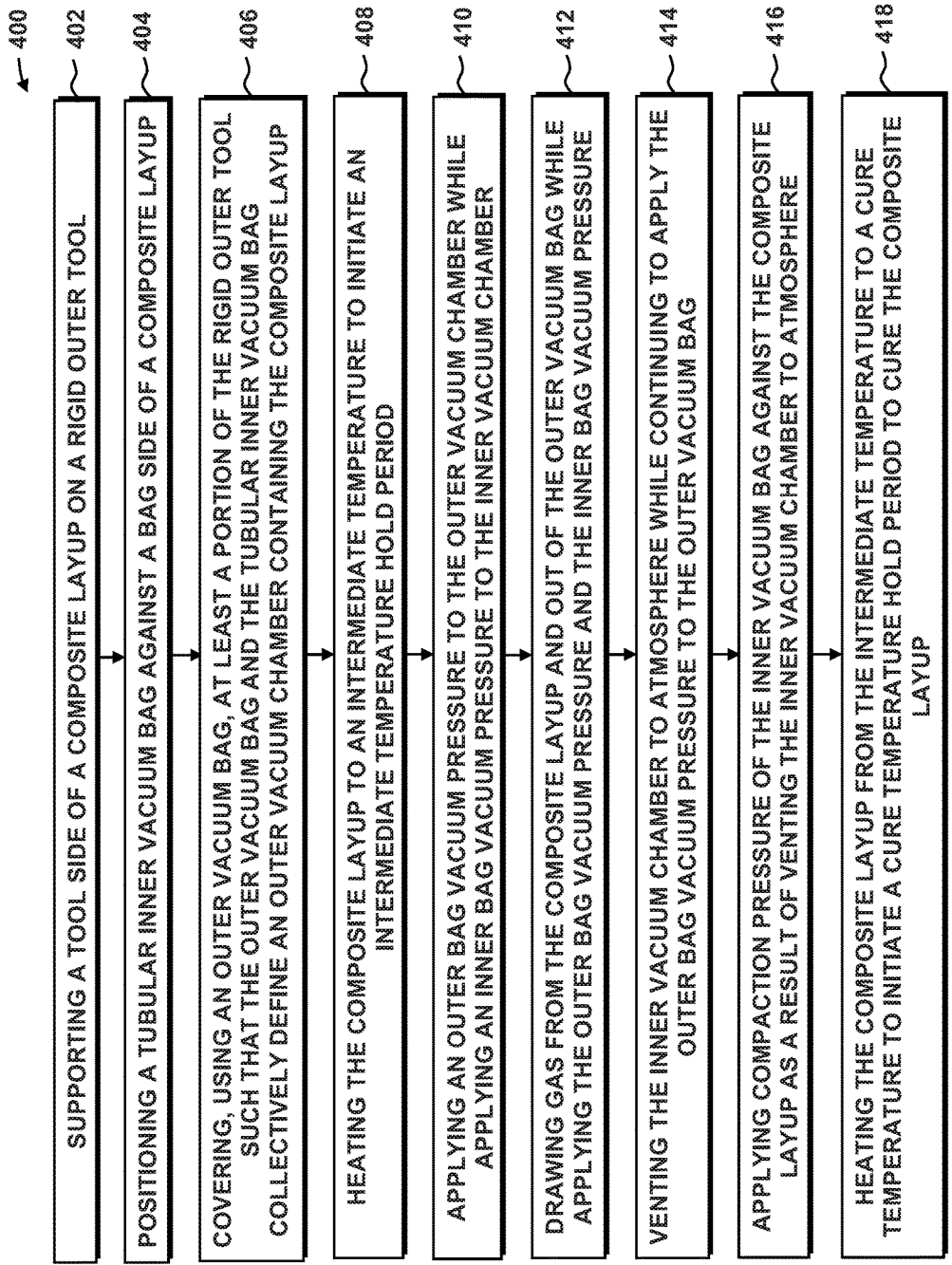
FIG. 20 is a flowchart illustrating an example of a method of manufacturing a composite structure using the tooling apparatus disclosed herein.
Figure 21:
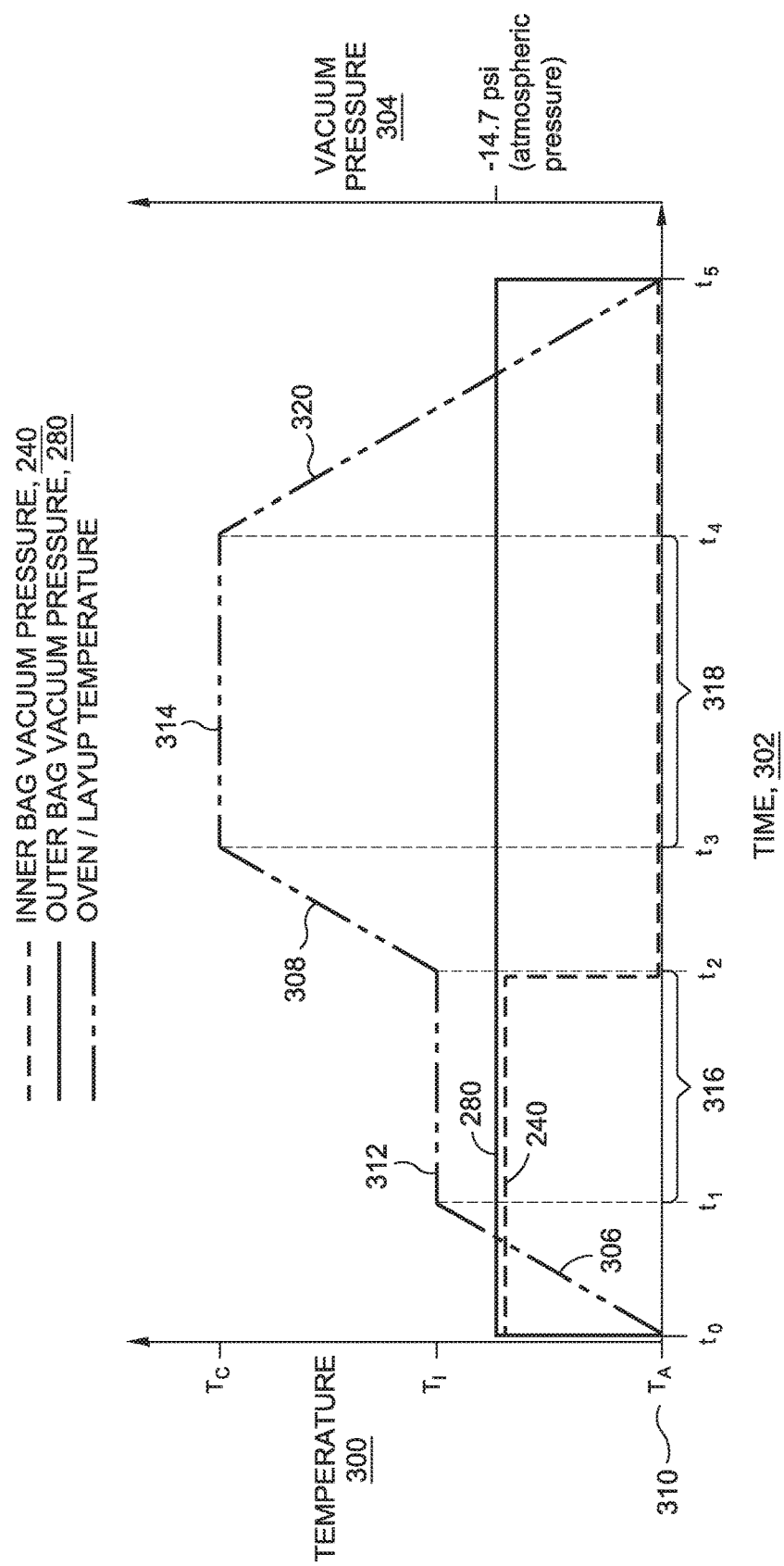
FIG. 21 is an illustration of a graph of temperature, time, and vacuum pressure in an example of a two-stage process of degassing, consolidating, and curing a composite layup.

FIG. 20 is a flowchart illustrating an example of a method 400 of manufacturing a composite structure 120 using the tooling apparatus 200 disclosed herein. The method 400 is described with reference to the graph of FIG. 21 and the diagrammatic illustrations of the tooling apparatus 200 of FIGS. 22-25. The method 400 may be described below in the context of degassing, consolidating, and curing a composite layup 122 wherein the resin is a thermosetting resin. The graph of FIG. 21 plots temperature 300 (e.g., of the composite layup 122 and/or an oven), time 302, and vacuum pressure 304 in an example of a two-stage process of degassing, consolidating, and curing a composite layup 122. Although the method 400 is described in the context of a two-stage process having (1) an intermediate temperature hold period 316 (e.g., a gel temperature hold period) and (2) a cure temperature hold period 318, the method 400 may be performed in a single-stage process (not shown) comprising a single elevated temperature hold period during which the composite layup 122 may be degassed, consolidated, and cured. Alternatively, the method 400 may be performed in a process (not shown) having three or more different temperature hold periods. Even further, the method 400 may be implemented for degassing, consolidating, and curing a composite layup 122 comprised of room-temperature-curable thermosetting resin, as mentioned above. However, the method 400 may also be implemented for processing (e.g., degassing, consolidating, and curing) a composite layup 122 comprised of thermoplastic resin.

Step 402 of the method 400 may include supporting a tool side 134 of a composite layup 122 on a rigid outer tool 202. In this regard, the method may include laying up one or more composite plies on a rigid outer tool 202 to form a composite layup 122 having a tool side 134 and a bag side 136. For the example wherein the rigid outer tool 202 comprises a clamshell mold 220 having a mold lower half 222 and a mold upper half 224, the step of supporting the tool side 134 of the composite layup 122 on the rigid outer tool 202 may include laying up a lower skin layup 138 on the mold lower half 222 (FIG. 8), and laying up an upper skin layup 140 on the mold upper half 224 (FIG. 9). In the example shown, the composite layup 122 has an airfoil-shaped cross-section 126 including a leading edge 128 and a trailing edge 130. However, the composite layup 122 may be provided in any size, shape, and configuration, without limitation.

The method 400 may further include assembling one or more internal element layups 141 with the lower skin layup 138 and/or the upper skin layup 140. For example, the method 400 may include installing an internal element layup 141 on the bag side 136 of the lower skin layup 138 and/or on the bag side 136 of the upper skin layup 140. As shown in FIG. 22, the internal element layup 141 may comprise a layup of a composite spar 146 which may extend between the lower skin layup 138 and the upper skin layup 140 when the mold lower half 222 and the mold upper half 224 are mated to one another.

Step 404 of the method 400 may include positioning a tubular inner vacuum bag 230 against the composite layup 122. For example, a tubular inner vacuum bag 230 may be positioned in contacting relation with the bag side 136 of the composite layup 122. As indicated above, each tubular inner vacuum bag 230 may have an interior 234 defining an inner vacuum chamber 236. In this regard, the method may include supporting the tubular inner vacuum bag 230 on a bag carrier 246 positioned within the tubular inner vacuum bag 230. The inner vacuum chamber 236 may be defined as the space between the tubular inner vacuum bag 230 and the bag carrier 246. As described below, the method may include drawing the tubular inner vacuum bag 230 against the bag carrier 246 during the application of the inner vacuum pressure on the inner vacuum chamber 236 to facilitate the installation of the tubular inner vacuum bag 230 into or against the composite layup 122. In addition, as mentioned below, the bag carrier 246 may prevent the collapse of the tubular inner vacuum bag 230 onto itself during the application of the inner vacuum pressure on the inner vacuum chamber 236.

In the example of the clamshell mold 220, the step of positioning the tubular inner vacuum bag 230 against the bag side 136 of the composite layup 122 may include positioning the tubular inner vacuum bag 230 against the bag side 136 of at least one of the lower skin layup 138 and the upper skin layup 140. As indicated above, the tubular inner vacuum bag 230 may be supported on a bag carrier 246. The method may optionally include installing strips of breather material (not shown) or other porous material in openings or slots (not shown) that may occur on one or both ends of the clamshell mold 220. For example, a slot may occur between a tubular inner vacuum bag 230 and a bag side 136 of the composite layup 122 (e.g., the lower skin layup 138 and/or the upper skin layup 140) when an outer bag vacuum pressure 280 is applied to the outer vacuum chamber 276 while an inner bag vacuum pressure 240 is applied to the inner vacuum chamber 236 resulting in an air gap 254 (e.g., see FIG. 24), as described below. The slot may be described as the opening to the air gap 254, and may be located on one or both ends of the clamshell mold 220. The installation of a strip of breather material into the slot (e.g., the opening to the air gap 254) may prevent the outer vacuum bag 270 from being sucked into the slot during the application of the outer bag vacuum pressure 280 on the outer vacuum chamber 276.

For composite layups 122 including an internal element layup 141 (e.g., spar 146 layup), the method may include positioning a pair of tubular inner vacuum bags 230 on opposite sides of the internal element layup 141 as shown in FIG. 14, wherein each one of the tubular inner vacuum bags 230 may be supported on a bag carrier 246. The method may additionally include mating the mold upper half 224 to the mold lower half 222 such that the lower skin layup 138 an upper skin layup 140 are mated together and the inner surfaces 204 of the lower skin layup 138 and upper skin layup 140 are in contact with the internal element layups 141 as shown in FIG. 15.

Step 406 of the method 400 may include covering at least a portion of the rigid outer tool 202 with an outer vacuum bag 270 such that the outer vacuum bag 270 and the one or more tubular inner vacuum bags 230 collectively define an outer vacuum chamber 276 containing the composite layup 122. As indicated above, the outer may be defined as a single contiguous volume occupying the space between the outer vacuum bag 270 and the one or more tubular inner vacuum bags 230. As shown in FIG. 16, the tubular inner vacuum bag 230 may be configured to extend out of the outer vacuum bag 270 at least on one end of the outer vacuum bag 270. The tubular inner vacuum bags 230 may be sealed to the outer vacuum bag 270 and may be fluidly coupled to an inner bag vacuum source 238. The step of covering the rigid outer tool 202 may include enclosing the rigid outer tool 202 with an outer vacuum bag 270 such that the outer vacuum bag 270 contains the composite layup 122 and the one or more tubular inner vacuum bags 230.

In the example of a clamshell mold 220, the step of covering the rigid outer tool 202 may include enveloping the clamshell mold 220 with an outer vacuum bag 270 (e.g., FIG. 15) such that the outer vacuum bag 270 contains the composite layup 122 and the one or more tubular inner vacuum bags 230, each of which may be supported on a bag carrier 246. Alternatively, the step of covering the rigid outer tool 202 may include sealing a mating joint 226 between the mold upper half 224 and the mold lower half 222 using one or more outer bag side strips 284 as shown in FIG. 18. In this regard, an outer bag side strip 284 may be applied to the mating joint 226 along each side of the clamshell mold 220. The method may additionally include sealing the opposing ends of the clamshell mold 220 using an outer bag end panel 286 on each end. As shown in FIG. 19, the tubular inner vacuum bags 230 may protrude or extend through at least one of the outer bag end panels 286. The outer bag end panel 286 may be sealed to the tubular inner vacuum bag 230 at a location where each tubular inner vacuum bag 230 protrudes through the outer bag end panel 286. Referring briefly to FIG. 22, shown is the vacuum-bagged tooling apparatus 200 enclosing a clamshell mold 220 which contains the composite layup 122. The tubular inner vacuum bags 230 and the outer vacuum bag 270 are open to the atmosphere 248 prior to the initiation of the curing process.

Step 408 of the method 400 may include increasing a temperature of the composite layup 122 during a first temperature ramp 306 (t0-t1 in FIG. 21) such as from ambient temperature 310 ($T_A$ in FIG. 21) at the start of the cure cycle (e.g., at time t0 in FIG. 21) to an elevated temperature to initiate a temperature hold period (e.g., at time t1 in FIG. 21). The heating of the composite layup 122 to the elevated temperature may comprise heating the composite layup 122 to an intermediate temperature 312 ($T_I$ in FIG. 21; e.g., a resin gelling temperature) and holding the composite layup 122 at the intermediate temperature 312 for an intermediate temperature hold period 316 (e.g., from t1-t2 in FIG. 21) during which the composite layup 122 may continue to outgas. The composite layup 122 may be heated to the elevated temperature (e.g., the intermediate temperature 312) to reduce the viscosity of the resin of the composite layup 122 and facilitate the evacuation of gas 132 (e.g., moisture, air, and/or volatiles) from the composite layup 122. The temperature of the composite layup 122 may be increased using one or more heating techniques including, but not limited to, positioning the tooling apparatus 200 in an oven (not shown), applying localized heating to the tooling apparatus 200, activating internal heating elements (not shown) that may be included in the rigid outer tool 202 and/or the bag carrier 246, or any one a variety of other heating techniques.

The method may include applying an inner bag vacuum pressure 240 to the tubular inner vacuum bags 230 to create an air gap 254 between the bag side 136 of the composite layup 122 and the tubular inner vacuum bag 230. FIG. 23 illustrates the application of an inner bag vacuum pressure 240 on the tubular inner vacuum bags 230 of the clamshell mold 220 while the outer vacuum bag 270 is exposed to atmosphere 248. The application of the inner bag vacuum pressure 240 on the tubular inner vacuum bags 230 may cause contraction 252 of the tubular inner vacuum bags 230 against the bag carriers 246 and resulting in the creation of an air gap 254 between the tubular inner vacuum bags 230 and the upper skin layup 140, the lower skin layup 138, and the internal element layups 141. The creation of the gaps 254 between the tubular inner vacuum bags 230 and the composite layup 122 may avoid restricting the escape of gas 132 which may otherwise be entrapped in the composite layup 122.

Step 410 of the method 400 may include applying an outer bag vacuum pressure 280 to the outer vacuum chamber 276 while applying an inner bag vacuum pressure 240 to the inner vacuum chamber 236. The inner bag vacuum pressure 240 may be no less than the outer vacuum pressure 280 to maintain the gap between the tubular inner vacuum bag 230 and the composite layup 122. FIG. 24 illustrates the application of the outer bag vacuum pressure 280 on the outer vacuum bag 270 using the outer bag vacuum source 278 during the application of the inner bag vacuum pressure 240 to each one of the tubular inner vacuum bags 230 using the inner bag vacuum source 238. In some examples, the inner bag vacuum pressure 240 may be applied at a level that is substantially equivalent to the outer bag vacuum pressure 280. For example, the method may include applying the inner bag vacuum pressure 240 at a level that is 0.5-1.5 in. Hg higher than the outer bag vacuum pressure 280. During the application of the outer bag vacuum pressure 280, the outer vacuum bag 270 may be sucked against the exterior of the clamshell mold 220. Likewise, during the application of the inner bag vacuum pressure 240, the tubular inner vacuum bags 230 may be sucked or contracted against the respective bag carriers 246 to maintain the gap 254 between the tubular inner vacuum bags 230 and the composite layup 122.

Step 412 of the method 400 may include drawing gas 132 from the composite layup 122 toward an outer bag vacuum port 282 and out of the outer vacuum bag 270 while applying the outer bag vacuum pressure 280 and the inner bag vacuum pressure 240. Advantageously, by simultaneously applying the outer bag vacuum pressure 280 and the inner bag vacuum pressure 240, the air gap 254 is maintained between the tubular inner vacuum bags 230 and the composite layup 122 which thereby allows for the free flow of gas 132 from the composite layup 122 and the evacuation of the gas 132 out of the outer bag vacuum 270. In some examples, the simultaneous application of the outer bag vacuum pressure 280 and the inner bag vacuum pressure 240 may be maintained during the first temperature ramp 306 and during the intermediate temperature hold period 316 from t0-t2 in FIG. 21. During the intermediate temperature hold period 316, the resin in the composite layup 122 may gradually increase in viscosity. When the resin reaches the gel point (e.g., at time t2 in FIG. 21), evacuation of the gas 132 from the composite layup 122 may be reduced.

Step 414 of the method 400 may include venting the inner vacuum chamber 236 to atmosphere 248 while continuing to apply the outer bag vacuum pressure 280 to the outer vacuum bag 270. FIG. 21 illustrates at t2 the reduction in vacuum pressure of the inner vacuum chamber 236 corresponding to the venting of the inner vacuum chamber 236 to atmosphere 248 at the initiation of the second temperature ramp 308 from the intermediate temperature 312 ($T_I$ in FIG. 21) to the cure temperature 314 ($T_C$ in FIG. 21). Although the graph in FIG. 21 illustrates the venting of the inner vacuum chamber 236 to atmosphere 248 at the start (e.g., at t2) of a second temperature ramp of the composite layup 122 from the intermediate temperature 312 ($T_I$ in FIG. 21) to the cure temperature 314 ($T_C$ in FIG. 21), the inner vacuum chamber 236 may be vented to atmosphere 248 at any point during the curing process. However, the inner vacuum chamber 236 is preferably vented to atmosphere 248 after a majority of the gas 132 in the composite layup 122 has been evacuated.

Step 416 of the method 400 may include applying compaction pressure 256 of the tubular inner vacuum bag 230 on the bag side 136 of the composite layup 122 as a result of venting the inner vacuum chamber 236 to atmosphere 248. FIG. 25 illustrates the venting to atmosphere 248 of the tubular inner vacuum bags 230 while maintaining the outer bag vacuum pressure 280 on the outer vacuum bag 270. The exposure of the tubular inner vacuum bags 230 to atmosphere 248 results in the outer bag vacuum pressure 280 forcing the tubular inner vacuum bags 230 against the bag sides 136 of the composite layup 122 and causing the application of compaction pressure 256 on the composite layup 122. In addition, the opposing bag sides 136 of the internal element layups 141 (e.g., the spars 146) may be compacted by the tubular inner vacuum bags 230 as a result of the venting of the inner vacuum chambers 236 to atmosphere 248 while the outer bag vacuum pressure 280 is maintained on the outer vacuum chamber 276.

Step 418 of the method 400 may include increasing the temperature of the composite layup 122 during the second temperature ramp 308 (t2-t3 in FIG. 21) from the intermediate temperature 312 ($T_I$ in FIG. 21) to a cure temperature 314 ($T_C$ in FIG. 21) to initiate a cure temperature hold period 318 (t3-t4 in FIG. 21) to cure the composite layup 122. The method may include maintaining the compaction pressure 256 on the composite layup 122 during the cure temperature hold period 318 until the composite layup 122 is cured to form a cured composite structure 120. In the example of FIG. 21, the tubular inner vacuum bags 230 may be vented to atmosphere 248 from time t2-t5 which may extend through the cure temperature hold period 318 until the composite layup 122 is cured. In some examples, gases may continue to be evacuated from the composite layup 122 during the cure temperature hold period 318. The method may include allowing the temperature of the cured composite structure 120 to reduce during a temperature cool down period 320 (FIG. 21) to ambient temperature ($T_A$ in FIG. 21).

Figure 26:
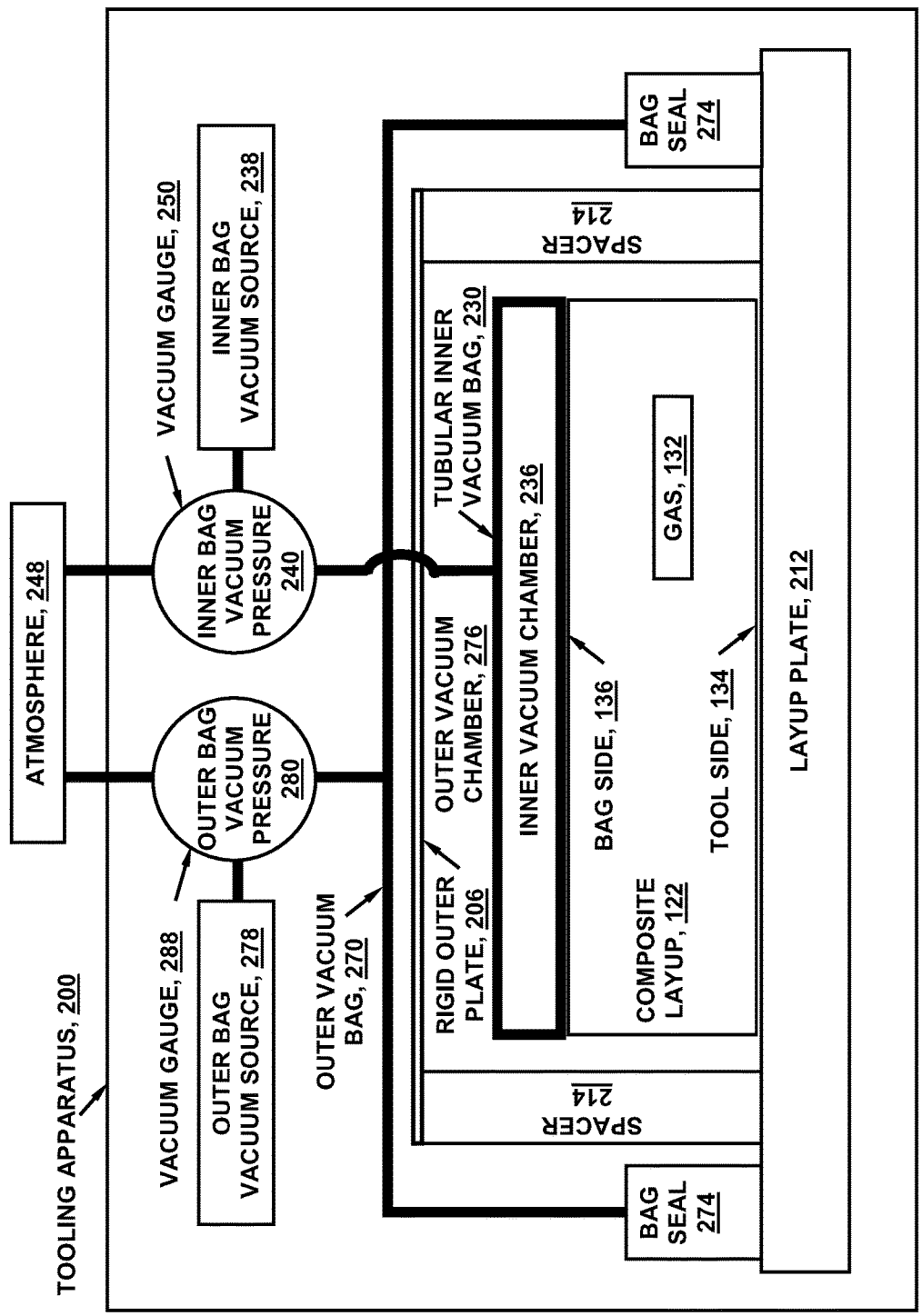
FIG. 26 is a block diagram of a further example of a tooling apparatus wherein the rigid outer tool is configured as a rigid outer plate supported on a layup plate by a spaced pair of spacers.

FIG. 26 is a block diagram of a further example of a tooling apparatus 200 wherein the rigid outer tool 202 is configured as a rigid outer plate 206 supported over a layup plate 212. The rigid outer plate 206 may have opposing plate edges 208 that may be supported on the layup plate 212 by a spaced pair of spacers 214. The rigid outer plate 206 may be positioned in non-contacting relation over the composite layup 122. The composite layup 122 may be laid up or positioned on the layup plate 212 prior to after the spacers 214 are placed on the layup plate 212. The tubular inner vacuum bag 230 may define an inner vacuum chamber 236 and may be positioned over the composite layup 122 prior to mounting the rigid outer plate 206 over the tubular inner vacuum bag 230.

The spacers 214 may be components that may be separately mounted on the layup plate 212. Alternatively, the spacers 214 may be integral with the plate edges 208 of the rigid outer plate 206, or the spacers 214 may be integral with the rigid outer plate 206. In a still further example, the rigid outer plate 206, the spacers 214, and the layup plate 212 may be integrally-formed to define a unitary rigid outer tool 202 circumscribing the composite layup 122 and the tubular inner vacuum bag 230. Regardless of the configuration of the rigid outer tool 202, the spacers 214, and the layup plate 212, the assembly may be open on at least one end through which the tubular inner vacuum bag 230 may protrude and may be fluidly coupled to an inner bag vacuum source 238. An outer vacuum bag 270 may seal the rigid outer plate 206, the composite layup 122, and the tubular inner vacuum bag 230 to the layup plate 212.

Figure 27:
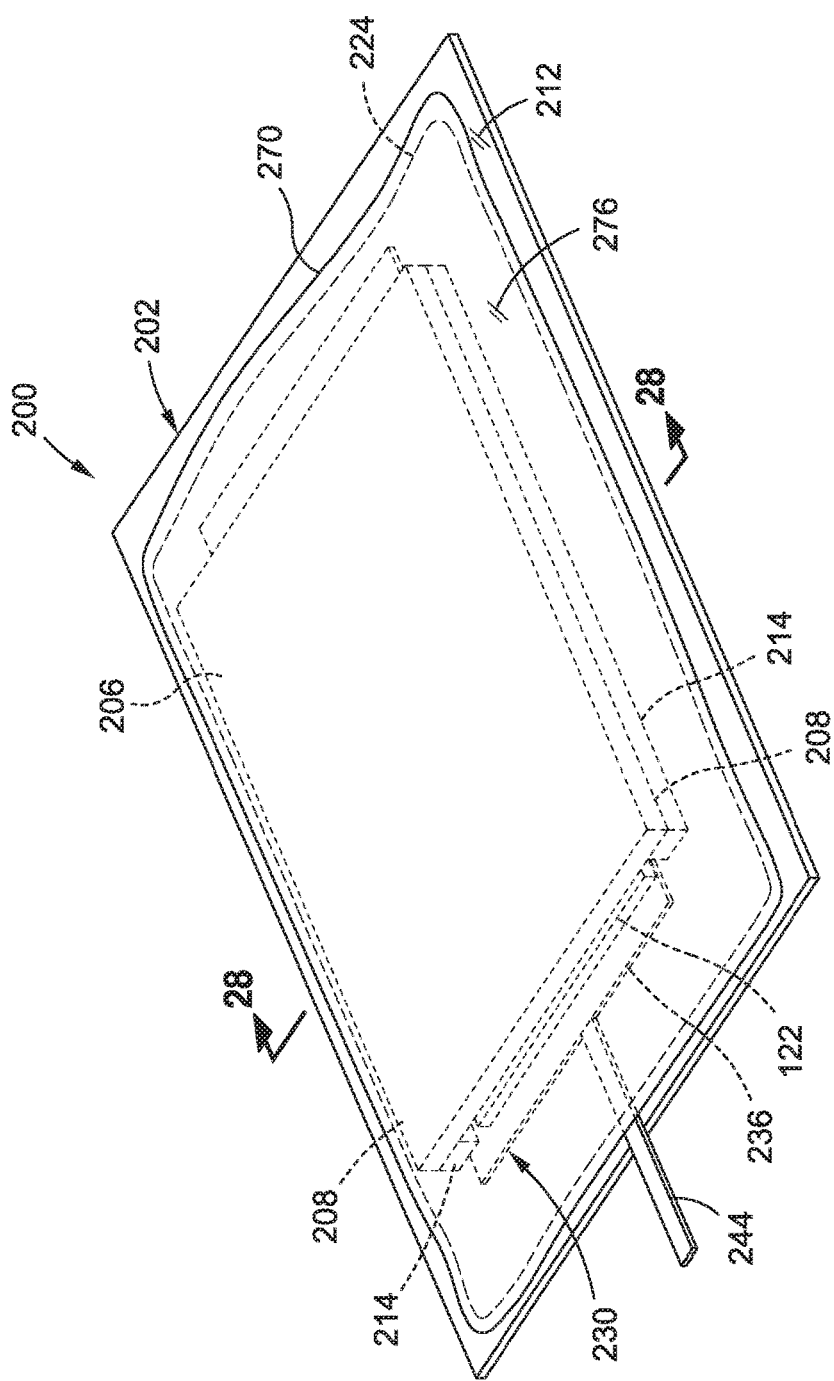
FIG. 27 is a perspective view of an example of a tooling apparatus illustrating a composite layup covered by a tubular inner vacuum bag which, in turn, is covered by a rigid outer plate supported on a layup plate by a pair of spacers.

FIG. 27 is a perspective view of an example of a tooling apparatus 200 illustrating a composite layup 122 covered by a tubular inner vacuum bag 230 which, in turn, is covered by a rigid outer plate 206 supported on a layup plate 212 by a pair of spacers 214. In the example shown, the outer vacuum bag 270 may cover the rigid outer plate 206. The outer vacuum bag 270 may include an outer bag perimeter edge 272 that may be sealed to the layup plate 212 by a bag sealant 274. Alternatively, the outer vacuum bag 270 may envelope the rigid outer plate 206, the spacers 214, the layup plate 212, the tubular inner vacuum bag 230, and the composite layup 122. Regardless of its configuration, the outer vacuum bag 270 forms a contiguous outer vacuum chamber 276 which may be defined as the space or volume between the tubular inner vacuum bag 230 and the outer vacuum bag 270.

In FIG. 27, the tubular inner vacuum bag 230 may include an inner bag vent tube 244 extending out of the outer vacuum bag 270 and fluidly coupled to the inner bag vacuum source 238. The outer vacuum bag 270 may be sealed around the inner bag vent tube 244. When an inner bag vacuum pressure 240 (e.g., FIG. 30) is applied to the inner vacuum chamber 236, a slot (not shown) may occur between the rigid outer plate 206 and the tubular inner vacuum bag 230 on at least one end of the rigid outer plate 206. To prevent the outer vacuum bag 270 from being sucked into the slot during the application of the outer bag vacuum pressure 280 on the outer vacuum chamber 276 while the inner bag vacuum pressure 240 is applied to the inner vacuum chamber 236, a strip of breather material (not shown) or other porous material may be installed in the slot on at least one end of the rigid outer plate 206, as mentioned above.

The above-described method 400 for manufacturing a composite layup 122 may also be implemented for the tooling apparatus 200 shown in FIG. 27. In this regard, FIGS. 28-31 illustrate a sequence for degassing, consolidating, and curing a composite layup 122 using the tooling apparatus 200 of FIG. 27. FIG. 28 illustrates the tubular inner vacuum bag 230 and the outer vacuum bag 270 open to the atmosphere 248 prior to the initiation of the curing process. The above-described step 402 of supporting the tool side 134 of the composite layup 122 on the rigid outer tool 202 may include supporting the tool side 134 of the composite layup 122 on the layup plate 212. The above-described step 404 of positioning the tubular inner vacuum bag 230 against the bag side 136 of the composite layup 122 may include positioning the tubular inner vacuum bag 230 between the rigid outer plate 206 and the bag side 136 of the composite layup 122 in a manner such that the rigid outer plate 206 may be supported on the layup plate 212 in spaced relation to the composite layup 122.

The above-described step 406 of covering at least a portion of the rigid outer tool 202 using the outer vacuum bag 270 may include enveloping the rigid outer plate 206, the layup plate 212, the tubular inner vacuum bag 230, and the composite layup 122 within the outer vacuum bag 270. Alternatively, as indicated above, the method may include covering the rigid outer plate 206 with the outer vacuum bag 270, and sealing the outer vacuum bag 270 to the layup plate 212 along an outer bag perimeter edge 272 such as by using a bag sealant 274. The method may include the above-described step 408 of heating the composite layup 122 to an intermediate temperature 312 ($T_I$ in FIG. 21; e.g., a resin gelling temperature) to initiate an intermediate temperature hold period 316 during which gas 132 may be evacuated from the composite layup 122.

The method 400 may also include the above-described step 410 of applying the outer bag vacuum pressure 280 to the outer vacuum chamber 276 while applying the inner bag vacuum pressure 240 to the inner vacuum chamber 236. FIG. 29 illustrates the application of the inner bag vacuum pressure 240 on the tubular inner vacuum bag 230 causing contraction 252 of the tubular inner vacuum bag 230 against itself, and thereby preventing the application of compaction pressure 256 by the tubular inner vacuum bag 230 on the composite layup 122. The inner bag vacuum pressure 240 may be applied by the inner bag vacuum source 238 through the inner bag vent tube 244. The outer bag vacuum pressure 280 may be applied by the outer bag vacuum source 278. The inner bag vacuum pressure 240 and outer bag vacuum pressure 280 may be generally equalized. In some examples, the inner bag vacuum pressure 240 may be no less than the outer bag vacuum pressure. FIG. 30 illustrates the application of the outer bag vacuum pressure 280 on the outer vacuum bag 270 while maintaining the inner bag vacuum pressure 240 on the tubular inner vacuum bag 230 and preventing the application of compaction pressure 256 on the composite layup 122 which may facilitate the evacuation of gas 132 from the composite layup 122 for discharge out of the outer vacuum bag 270 as described above in step 412.

Figure 32:
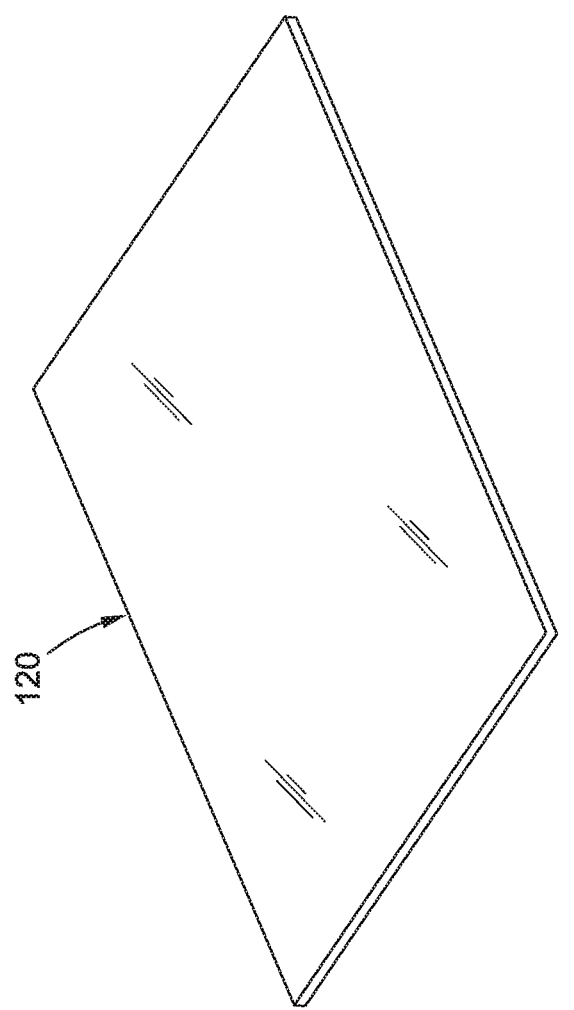
FIG. 32 is a perspective view of a composite structure that may be degassed, consolidated, and cured using the tooling apparatus illustrated in FIGS. 27-31.

FIG. 31 illustrates the above-described step 414 wherein the tubular inner vacuum bag 230 is vented to atmosphere 248 while maintaining the outer bag vacuum pressure 280 on the outer vacuum bag 270. The tubular inner vacuum bag 230 is sandwiched between the rigid hundred plate and the composite layup 122. The venting of the tubular inner vacuum bag 230 to atmosphere 248 may result in the application of compaction pressure 256 by the tubular inner vacuum bag 230 on the composite layup 122. The compaction pressure 256 may be maintained on the composite layup 122 at least during the cure temperature hold period 318. FIG. 32 illustrates an example of a cured composite structure 120 that may be manufactured using the method 400 implemented in the tooling apparatus 200 of FIGS. 27-31. As can be seen, the composite structure 120 has a generally planar shape corresponding to the planar shape of the layup plate 212.

Figure 33:
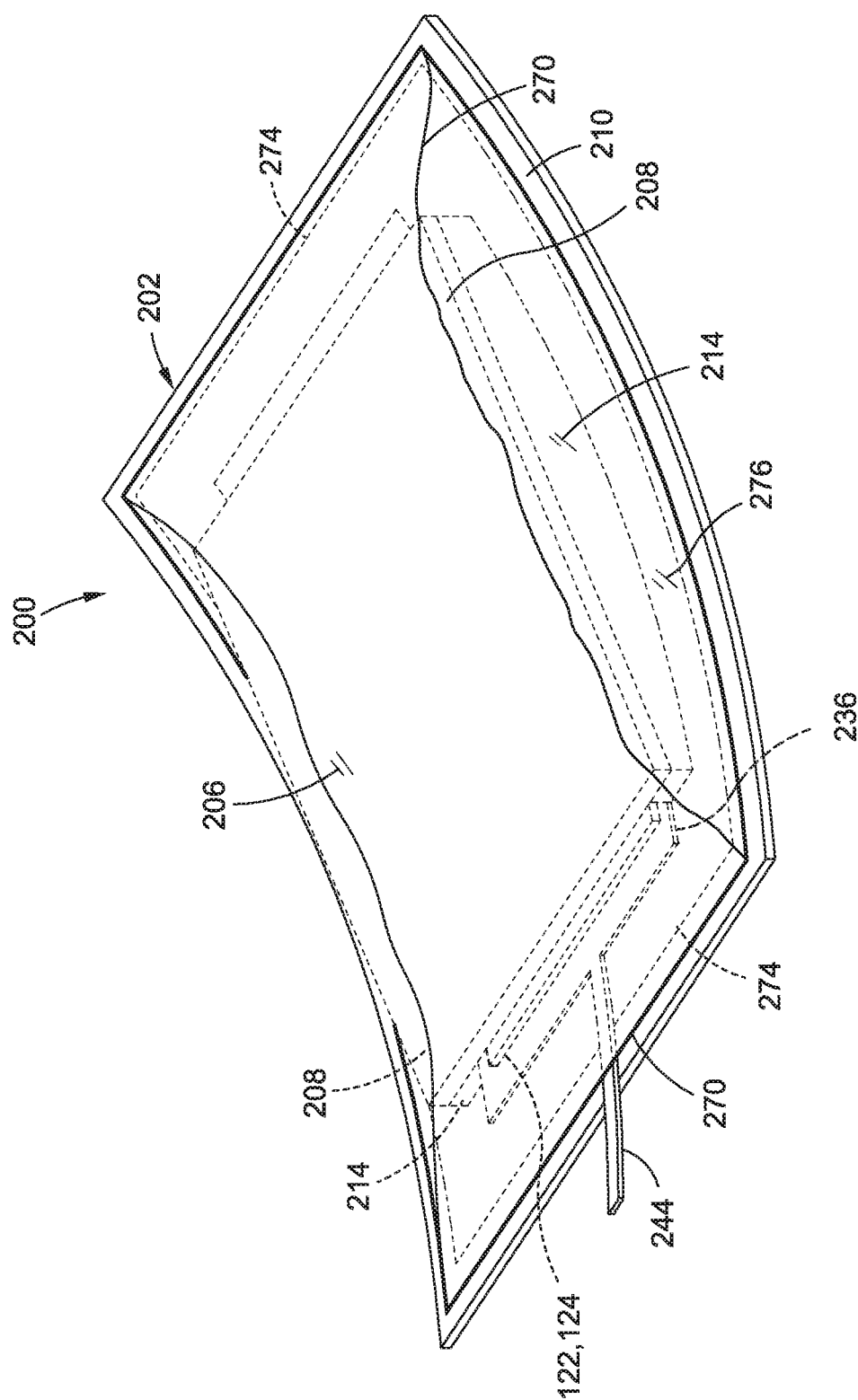
FIG. 33 is a perspective view of a further example of a tooling apparatus wherein the layup plate has a plate contour and the rigid outer plate is supported by spacers that are contoured complementary to the plate contour of the layup plate.

FIG. 33 is a perspective view of an example of a tooling apparatus 200 wherein the layup plate 212 has a single-curvature plate contour 210 for forming a complementary-contoured composite structure 120. The rigid outer plate 206 may have a generally planar shape to minimize tooling costs. The rigid outer plate 206 may be supported by spacers 214 that are contoured complementary to the plate contour 210 of the layup plate 212. FIG. 34 is a perspective view of a composite structure 120 having a part contour 124 manufactured using the tooling apparatus 200 illustrated in FIG. 33. As may be appreciated, the layup plate 212 may be provided in any one of a variety of different contours, and is not limited to the single-curvature plate contour 210 shown in FIG. 33. For example, the layup plate 212 may have a complex curvature and/or may include one or more planar portions for forming a composite structure 120 having a complementary part contour 124.

The rigid outer plate 206 and the layup plate 212 may also be configured for manufacturing relatively large and/or complex components using the above-described method 400. For example, a rigid outer plate 206 and a layup plate 212 may be configured for manufacturing a large composite structure (not shown) having an arced contour and a plurality of angled webs, such as a composite fuselage frame (not shown) having a hoop shape. The rigid outer plate 206 may be provided as a relatively thick (e.g., approximately 1 inch thick) metallic (e.g., steel) plate, and may be supported on the layup plate 212 which may be configured complementary to the composite layup 122 of the composite fuselage frame. The rigid outer plate 206 may be supported over the layup plate 212 in a manner providing a relatively small gap (e.g., approximately 0.12 inch) between the rigid outer plate 206 and the composite layup 122. The tubular inner vacuum bag 230 may be provided as a vacuum diaphragm bag (e.g., formed of elastic material such as silicone), as opposed to a non-elastic envelope-type vacuum bag (e.g., Nylon'). The tubular inner vacuum bag 230 may be positioned in the gap between the rigid outer plate 206 and the composite layup 122. The relatively small gap size may reduce the risk of tearing of the tubular inner vacuum bag 230 during a cure cycle due to the reduced amount of space in which the tubular inner vacuum bag 230 may move.

Advantageously, the above-described tooling apparatus 200 and method 400 allows for degassing, consolidating, and curing a composite layup 122 in an out-of-autoclave process allowing for evacuation of gas 132 such as air, moisture, and/or volatiles from the composite layup 122. The tooling apparatus 200 and method 400 advantageously avoids the need for expensive out-of-autoclave composite materials and expensive vacuum-sealed tooling. In this regard, the presently-disclosed tooling apparatus 200 and method 400 provides a unique process that allows for the manufacturing of inexpensive and high-quality composite structures 120 in an oven or at room temperature using existing and/or relatively inexpensive rigid outer tooling.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A tooling apparatus for manufacturing a composite structure, comprising:
   a rigid outer tool configured to receive a tool side of a composite layup;
   a tubular inner vacuum bag configured to be placed in contact with a bag side of the composite layup, the tubular inner vacuum bag having an interior defining an inner vacuum chamber;
   an outer vacuum bag covering at least a portion of the rigid outer tool such that the outer vacuum bag and the tubular inner vacuum bag collectively define an outer vacuum chamber containing the composite layup;
   an outer bag vacuum source fluidly coupled to the outer vacuum bag and configured to apply an outer bag vacuum pressure on the outer vacuum chamber;
   an inner bag vacuum source fluidly coupled to the tubular inner vacuum bag and configured to apply an inner bag vacuum pressure on the inner vacuum chamber during application of the outer bag vacuum pressure on the outer vacuum chamber; and
   the rigid outer tool separating the outer vacuum bag from at least one of the tubular inner vacuum bag and the composite layup at locations where the tubular inner vacuum bag applies compaction pressure to the bag side of the composite layup.

2. The tooling apparatus of claim 1, wherein:
   the tubular inner vacuum bag extends out of and is sealed to the outer vacuum bag and coupled to the inner bag vacuum source.

3. The tooling apparatus of claim 1, further including:
   a bag carrier positioned inside the tubular inner vacuum bag and supporting the tubular inner vacuum bag during application of an inner bag vacuum pressure on the inner vacuum chamber.

4. The tooling apparatus of claim 1, wherein:
   the rigid outer tool comprises a clamshell mold having a mold lower half and a mold upper half, at least one of the mold lower half and the mold upper half configured to receive the composite layup;
   the tubular inner vacuum bag is supported on a bag carrier and positioned between opposing bag sides of the composite layup; and
   the mold lower half and the mold upper half configured to be mated together to form the clamshell mold enclosing the composite layup, the bag carrier and the tubular inner vacuum bag.

5. The tooling apparatus of claim 4, wherein:
   the clamshell mold includes a pair of the bag carriers each supporting a tubular inner vacuum bag and defining a respective inner vacuum chamber and positioned on opposite sides of an internal element layup included with the composite layup.

6. The tooling apparatus of claim 1, wherein:
the composite layup has an airfoil-shaped cross-section including a leading edge and a trailing edge.

7. The tooling apparatus of claim 1, wherein:
the rigid outer tool comprises a rigid outer plate supported in spaced relation over a layup plate and positioned in non-contacting relation over the composite layup supported on the layup plate; and
the tubular inner vacuum bag positioned between the composite layup and the rigid outer plate.

8. The tooling apparatus of claim 7, wherein:
the tubular inner vacuum bag includes an inner bag vent tube extending out of the outer vacuum bag and fluidly coupled to the inner bag vacuum source.

9. The tooling apparatus of claim 7, wherein:
the layup plate has a plate contour for imparting a part contour to the composite layup.

10. A tooling apparatus for manufacturing a composite structure, comprising:
a rigid outer plate supported in spaced relation above a layup plate, the layup plate configured to receive a tool side of a composite layup;
a tubular inner vacuum bag defining an inner vacuum chamber and configured to be positioned between the rigid outer plate and a bag side of the composite layup;
an outer vacuum bag sealing the composite layup and tubular inner vacuum bag to the layup plate, the outer vacuum bag and the tubular inner vacuum bag collectively defining an outer vacuum chamber containing the composite layup and the tubular inner vacuum bag;
an outer bag vacuum source fluidly coupled to the outer vacuum bag and configured to apply an outer bag vacuum pressure on the outer vacuum chamber;
an inner bag vacuum source fluidly coupled to the tubular inner vacuum bag and configured to apply an inner bag vacuum pressure on the inner vacuum chamber during application of the outer bag vacuum pressure on the outer vacuum chamber; and
the rigid outer plate separating the outer vacuum bag from at least one of the tubular inner vacuum bag and the composite layup at locations where the tubular inner vacuum bag applies compaction pressure to the bag side of the composite layup.

11. A tooling apparatus for manufacturing a composite structure, comprising:
a clamshell mold having a mold lower half and a mold upper half configured to respectively receive a lower skin layup and an upper skin layup and an internal element layup extending between a bag side of the lower skin layup and a bag side of the upper skin layup;
a pair of tubular inner vacuum bags each defining an inner vacuum chamber and supported on a bag carrier and positioned between the lower skin layup and the upper skin layup and located on opposite sides of the internal element layup;
an outer vacuum bag covering at least a portion of the clamshell mold such that the outer vacuum bag and the pair of tubular inner vacuum bags collectively define an outer vacuum chamber containing the lower skin layup, the upper skin layup, and the internal element layup;
an outer bag vacuum source fluidly coupled to the outer vacuum bag and controlling an outer bag vacuum pressure within the outer vacuum chamber; and
an inner bag vacuum source fluidly coupled to the tubular inner vacuum bags and controlling an inner bag vacuum pressure within the inner vacuum chamber.

12. A method of manufacturing a composite structure, comprising:
supporting a tool side of a composite layup on a rigid outer tool;
positioning a tubular inner vacuum bag against a bag side of the composite layup, the tubular inner vacuum bag having an interior defining an inner vacuum chamber;
covering, using an outer vacuum bag, at least a portion of the rigid outer tool such that the outer vacuum bag and the tubular inner vacuum bag collectively define an outer vacuum chamber containing the composite layup;
applying an outer bag vacuum pressure to the outer vacuum chamber while applying an inner bag vacuum pressure to the inner vacuum chamber, the inner bag vacuum pressure being no less than the outer bag vacuum pressure; and
drawing gas from the composite layup and out of the outer vacuum bag while applying the outer bag vacuum pressure and the inner bag vacuum pressure, the rigid outer tool separating the outer vacuum bag from at least one of the tubular inner vacuum bag and the composite layup at locations where the tubular inner vacuum bag applies compaction pressure to the bag side of the composite layup.

13. The method of claim 12, further including:
venting the inner vacuum chamber to atmosphere while continuing to apply the outer bag vacuum pressure to the outer vacuum bag; and
applying compaction pressure of the tubular inner vacuum bag on the bag side of the composite layup as a result of venting the inner vacuum chamber to atmosphere.

14. The method of claim 13, further including:
maintaining the compaction pressure on the composite layup until the composite layup is cured to form a cured composite structure.

15. The method of claim 12, wherein the step of applying the inner bag vacuum pressure and the outer bag vacuum pressure includes:
applying the inner bag vacuum pressure at a level substantially equivalent to the outer bag vacuum pressure.

16. The method of claim 12, further including:
increasing a temperature of the composite layup to an elevated temperature during application of at least one of the outer bag vacuum pressure and the inner bag vacuum pressure.

17. The method of claim 12, further including:
supporting the tubular inner vacuum bag on a bag carrier positioned within the tubular inner vacuum bag.

18. The method of claim 12, wherein the rigid outer tool comprises a clamshell mold having a mold lower half and a mold upper half, the step of supporting the tool side of the composite layup on the rigid outer tool comprising at least one of:
laying up a lower skin layup on the mold lower half; and
laying up an upper skin layup on the mold upper half.

19. The method of claim 18, further including:
assembling an internal element layup with at least one of the lower skin layup and the upper skin layup; and
positioning on opposite sides of the internal element layup a pair of tubular inner vacuum bags each supported on a bag carrier.

20. The method of claim 18, wherein:
the composite layup has an airfoil-shaped cross-section including a leading edge and a trailing edge.

21. The method of claim 12, wherein the steps of supporting the tool side of the composite layup on the rigid outer tool, and positioning the tubular inner vacuum bag against the bag side of the composite layup respectively comprise:
- supporting the tool side of the composite layup on a layup plate; and
- positioning the tubular inner vacuum bag between a rigid outer plate and the bag side of the composite layup, the rigid outer plate being supported on the layup plate in spaced relation to the composite layup.

22. The method of claim 21, wherein application of the inner bag vacuum pressure includes:
- applying the inner bag vacuum pressure through an inner bag vent tube extending out of the outer vacuum bag and fluidly coupled to an inner bag vacuum source.

* * * * *